US00RE43083E

(19) United States
(12) Reissued Patent
Nishimura et al.

(10) Patent Number: US RE43,083 E
(45) Date of Reissued Patent: *Jan. 10, 2012

(54) GAS DISCHARGEABLE PANEL

(75) Inventors: Masaki Nishimura, Kadoma (JP); Hidetaka Higashino, Kadoma (JP); Ryuichi Murai, Kadoma (JP); Yusuke Takata, Kadoma (JP); Nobuaki Nagao, Kadoma (JP); Toru Ando, Ibaraki (JP); Naoki Kosugi, Kadoma (JP); Hiroyuki Tachibana, Ibaraki (JP)

(73) Assignee: Panasonic Corporation, Osaka (JP)

( * ) Notice: This patent is subject to a terminal disclaimer.

(21) Appl. No.: 12/043,881

(22) Filed: Mar. 6, 2008

Related U.S. Patent Documents

Reissue of:
(64) Patent No.: 7,009,587
Issued: Mar. 7, 2006
Appl. No.: 10/344,654
PCT Filed: Aug. 16, 2001
PCT No.: PCT/JP01/07049
§ 371 (c)(1),
(2), (4) Date: Aug. 29, 2003
PCT Pub. No.: WO02/17345
PCT Pub. Date: Feb. 28, 2002

(30) Foreign Application Priority Data

Aug. 18, 2000 (JP) ..... 2000-248369
Aug. 30, 2000 (JP) ..... 2000-260395
Oct. 11, 2000 (JP) ..... 2000-310413

(51) Int. Cl.
*G09G 3/28* (2006.01)
*G09G 3/10* (2006.01)
*H01J 17/49* (2006.01)

(52) U.S. Cl. ..... 345/67; 345/60; 345/63; 345/66; 345/69; 345/68; 315/169.4; 315/169.1; 313/583; 313/584; 313/585; 313/587; 313/586

(58) Field of Classification Search ..... 345/43, 345/60–69, 205, 206, 211, 214; 315/169.1–169.4, 315/167, 168; 313/492, 495, 504, 583–587
See application file for complete search history.

(56) References Cited

U.S. PATENT DOCUMENTS 3,336,051 A * 8/1967 Dale ..... 280/423.1
3,875,472 A * 4/1975 Schermerhorn ..... 345/182
3,893,713 A * 7/1975 Ivy ..... 280/511
4,553,143 A * 11/1985 Lustig ..... 345/80
4,657,274 A * 4/1987 Mann et al. ..... 280/433
5,786,794 A * 7/1998 Kishi et al. ..... 345/60
(Continued)

FOREIGN PATENT DOCUMENTS

CN 1200554 12/1998
(Continued)

OTHER PUBLICATIONS

Chinese Patent Application No. 200810108723.8 Office Action dated Aug. 16, 2010, 9 pages.

*Primary Examiner* — Prabodh M Dharia

(57) ABSTRACT

A gas discharge panel includes a first substrate and a second substrate. A plurality of display electrode pairs which are each made up of a sustain electrode and a scan electrode are formed on the first substrate, and the first substrate and the second substrate are set facing each other with a plurality of barrier ribs in between so as to form a plurality of cells. In this gas discharge panel, at least one of the sustain electrode and the scan electrode includes: a plurality of line parts; and a discharge developing part which makes a gap between adjacent line parts smaller in areas corresponding to channels between adjacent barrier ribs than in areas corresponding to the barrier ribs.

57 Claims, 30 Drawing Sheets

U.S. PATENT DOCUMENTS

| | | | | |
|---|---|---|---|---|
| 5,788,258 | A * | 8/1998 | Gill et al. | 280/491.1 |
| 6,160,345 | A | 12/2000 | Tanaka et al. | |
| 6,208,082 | B1 * | 3/2001 | Kim et al. | 315/169.1 |
| 6,407,503 | B1 * | 6/2002 | Mizobata | 313/587 |
| 6,459,201 | B1 * | 10/2002 | Schermerhorn et al. | 313/586 |
| 6,483,488 | B1 * | 11/2002 | Miyazaki | 345/60 |
| 6,512,337 | B2 * | 1/2003 | Hirano et al. | 315/169.4 |
| 6,520,528 | B2 * | 2/2003 | Fandrich et al. | 280/496 |
| 6,703,792 | B2 * | 3/2004 | Kawada et al. | 315/169.4 |
| 6,707,259 | B2 * | 3/2004 | Nagao et al. | 315/169.4 |
| 6,744,413 | B2 * | 6/2004 | Nunomura | 345/60 |
| 6,753,645 | B2 * | 6/2004 | Haruki et al. | 313/486 |
| 6,927,751 | B2 * | 8/2005 | Ide et al. | 345/67 |
| 7,009,587 | B2 * | 3/2006 | Nishimura et al. | 345/67 |
| 7,045,962 | B1 * | 5/2006 | Murai et al. | 313/582 |
| 2002/0034917 | A1 | 3/2002 | Tanaka et al. | |
| 2002/0036466 | A1 | 3/2002 | Tanaka et al. | |
| 2003/0146713 | A1 * | 8/2003 | Nagao et al. | 315/169.4 |
| 2004/0032215 | A1 * | 2/2004 | Nishimura et al. | 315/169.3 |

FOREIGN PATENT DOCUMENTS

| | | | |
|---|---|---|---|
| EP | 0 939 420 | A1 | 9/1999 |
| EP | 1 052 670 | A1 | 11/2000 |
| JP | 03-187125 | | 8/1991 |
| JP | 04-036931 | | 2/1992 |
| JP | 05-290744 | | 11/1993 |
| JP | 8250030 | | 9/1996 |
| JP | 8315735 | | 11/1996 |
| JP | 11-133914 | | 5/1999 |
| JP | 11-212515 | | 8/1999 |
| JP | 11-250810 | | 9/1999 |
| JP | 11-297212 | | 10/1999 |
| JP | 11-297214 | | 10/1999 |
| JP | 2000-106090 | | 4/2000 |
| JP | 2000-294149 | | 10/2000 |
| JP | 2000-323045 | | 11/2000 |
| JP | 2001-143623 | | 5/2001 |
| JP | 2001-250484 | | 9/2001 |
| WO | WO 97/20301 | | 6/1997 |

* cited by examiner

GAS DISCHARGEABLE PANEL

Matter enclosed in heavy brackets [ ] appears in the original patent but forms no part of this reissue specification; matter printed in italics indicates the additions made by reissue.

This application is a 371 of PCT/JP01/07049, filed Aug. 16, 2001.

1. Technical Field

The present invention relates to a gas discharge panel such as a plasma display panel.

2. Background Art

Plasma display panels (PDPs) are one type of gas discharge panel. PDPs enable large-screen slimline televisions to be produced relatively easily, and so are receiving attention as next-generation display panels. Currently, sixty-inch models have already been commercialized.

FIG. 26 is a partial sectional perspective view showing a main construction of a typical surface discharge AC (alternating current) PDP. In the drawing, the z direction is a direction along the thickness of the PDP, whilst the xy plane is a plane that is in parallel with the panel plane of the PDP. As illustrated, this PDP 1 is roughly made up of a front panel FP and a back panel BP which are set with their main surfaces facing each other.

A front panel glass 2 serves as a substrate for the front panel FP. A plurality of pairs of display electrodes 4 and 5 (scan electrode 4 and sustain electrode 5) are formed on one main surface of the front panel glass 2, so as to extend in the x direction. Surface discharge is performed between display electrodes 4 and 5 which form a pair. As one example, the display electrodes 4 and 5 are made by mixing Ag with glass.

Power is supplied to the scan electrodes 4 independently of each other. Meanwhile, the sustain electrodes 5 are all connected to the same potential.

The main surface of the front panel glass 2 on which the display electrodes 4 and 5 have been arranged is coated with a dielectric layer 6 made of an insulating material and a protective layer 7, in this order.

A back panel glass 3 serves as a substrate for the back panel BP. A plurality of stripe address electrodes 11 are aligned with fixed intervals on one main surface of the back panel glass 3, so as to extend in they direction. The address electrodes 11 are made by mixing Ag with glass.

The main surface of the back panel glass 3 on which the address electrodes 11 have been arranged is coated with a dielectric layer 10 made of an insulating material. Barrier ribs 8 are arranged in the gaps between the adjacent address electrodes 11, on the dielectric layer 10. Phosphor layers 9R, 9G, and 9B corresponding to the colors of red (R), green (G), and blue (B) are formed on the side faces of the adjacent barrier ribs 8 and on the dielectric layer 10 between these adjacent barrier ribs 8.

In FIG. 26, the phosphor layers 9R, 9G, and 9B are shown as having the same width in the x direction. However, to balance the luminance of each of these phosphors, a phosphor layer of a specific color may be formed wider in the x direction than other phosphor layers.

The front panel FP and the back panel BP with the above constructions are set facing each other so that the display electrodes 4 and 5 and the address electrodes 11 intersect at right angles.

The front panel FP and the back panel BP are then sealed along their edges, using a sealing material such as a glass frit. Hence the inside of the front panel FP and back panel BP is hermetically sealed.

A discharge gas (filler gas) which includes Xe is enclosed in the sealed inside of the front panel FP and back panel BP, at a predetermined pressure (conventionally around 40 kPa to 66.5 kPa).

Here, the spaces partitioned by the dielectric layer 6, phosphor layers 9R, 9G, and 9B, and adjacent barrier ribs 8 between the front panel FP and the back panel BP are discharge spaces 12. Also, the areas where the pairs of display electrodes 4 and 5 cross over the address electrodes 11 with the discharge spaces 12 therebetween are cells for image display (not illustrated). FIG. 27 shows a matrix that is formed by the plurality of pairs of display electrodes 4 and 5 (N lines) and the plurality of address electrodes 11 (M lines) in the PDP.

This PDP is driven in the following way. In each cell, discharge is initiated between the address electrode 11 and one of the display electrodes 4 and 5.

Discharge between the display electrodes 4 and 5 causes ultraviolet light of a short wavelength (Xe resonance lines with a wavelength of about 147 nm) to be generated.

This ultraviolet light excites the phosphor layers 9R, 9G, and 9B to emit visible light. Hence an image is displayed.

A method of driving a conventional PDP is explained in greater detail below, with reference to FIGS. 28 and 29.

FIG. 28 is a block conceptual diagram of an image display device (PDP drive device) that uses a conventional PDP. FIG. 29 shows one example of drive waveforms that are applied to the electrodes of the panel.

As shown in FIG. 28, the PDP display device includes a frame memory 100, an output processing circuit 110, an address electrode drive device 120, a sustain electrode drive device 130, and a scan electrode drive device 140, for driving the PDP. The scan electrode drive device 140, the sustain electrode drive device 130, and the address electrode drive device 120 are respectively connected to the scan electrodes 4, the sustain electrodes 5, and the address electrodes 11. They are also connected to the output processing circuit 110.

This being so, the PDP is driven as follows. Image information is input in the frame memory 100 from outside. This image information is introduced from the frame memory 100 into the output processing circuit 110, based on timing information. After this, the output processing circuit 110 instructs the scan electrode drive device 140, the sustain electrode drive device 130, and the address electrode drive device 120 to apply pulse voltages to the electrodes 4, 5, and 11, according to the image information and the timing information. This produces an image display.

As shown in FIG. 29, the PDP drive method produces an image display through a sequence of a set-up period, a write period, a sustain period, and an erase period.

The NTSC standard for television images stipulates a frame rate of 60 frames per second. PDPs are fundamentally only capable of two display states, ON and OFF. Accordingly, a method is employed in which a field that is an illumination time period of each color of red (R), green (G), and blue (B) is divided into a plurality of sub-fields and the ON and OFF states in each sub-field are combined to express a gray scale.

FIG. 30 shows a method of dividing into such sub-fields, to express 256 gray levels for each color in a conventional AC PDP. Here, the sub-fields are weighed with the numbers of sustain pulses applied in the discharge sustain period in the ratio of 1, 2, 4, 8, 16, 32, 64, and 128. Combinations of this eight-bit binary express a 256-level gray scale.

To drive the PDP, a set-up pulse is applied to the scan electrodes 4 in each sub-field, to set-up a wall charge in the cells in the panel. Following this, a scan pulse and a write pulse are applied respectively to a scan electrode 4 and sustain electrode 5 at the top in the y direction (on the top line of the display), to perform write discharge. As a result, a wall charge is accumulated on the dielectric layer 6 in the cells corresponding to the scan electrode 4 and sustain electrode 5.

In the same manner, a scan pulse and a write pulse are applied to each pair of scan electrode 4 and sustain electrode 5 that follows, to accumulate a wall charge on the dielectric layer 6 in the cells corresponding to the pair. This is repeated for all pairs of display electrodes 4 and 5, thereby writing one screen of latent image.

After this, the address electrodes 11 are grounded, and a sustain pulse is applied alternately to the scan electrodes 4 and the sustain electrodes 5 to perform sustain discharge. In the cells where a wall charge has been accumulated on the dielectric layer 6, discharge takes place as a result of the potential on the dielectric layer 6 exceeding a discharge firing voltage. Accordingly, sustain discharge is performed in the cells selected by the write pulse, while the sustain pulse is being applied (sustain period). During this sustain discharge period, discharge is initiated between the address electrode 11 and one of the display electrodes 4 and 5 in each cell. Discharge between the display electrodes 4 and 5 causes ultraviolet light of a short wavelength (Xe resonance lines, a wavelength of about 147 nm) to be generated. This ultraviolet light excites the phosphor layers 9R, 9G, and 9B to emit visible light. This produces an image display.

After this, a narrow erase pulse is applied to cause incomplete discharge. As a result, the wall charge is erased to clear the displayed image.

Today, electrical products are desired to consume as little power as possible. Accordingly, there have been expectations for the reduction of power consumption when driving a PDP. Due to the recent increases in the size and resolution of PDPs, the power consumption for PDPs tends to increase. This heightens the needs for technologies that achieve lower power consumption. Also, PDPs are fundamentally expected to exhibit stable image display performance.

For this reason, it is desirable to reduce power consumption for PDPs while maintaining stable driving performance and high panel luminance. In other words, it is desirable to improve illumination efficiency for PDPs.

To improve illumination efficiency, research has been done on the areas such as the improvement of conversion efficiency from ultraviolet to visible light in a phosphor. However, still more improvements in illumination efficiency are to be desired.

In conventional panels, the following structure is used for display electrodes, in order to improve panel luminance when displaying images. Each display electrode is formed by providing a bus line of metal electrode on a wide strip-shaped transparent electrode, thereby expanding the electrode area. This being so, to suppress an increase of discharge current caused by this structure or to reduce the number of processing steps by omitting the transparent electrode, various techniques have been proposed. One example is an electrode structure in which the electrode is divided into a plurality of parts to have openings (e.g. Japanese Patent No. 2734405). However, when such a structure is used, the following problem arises. Since discharge grows gradually while jumping from one electrode part to another, the drive voltage needs to be raised to spread the discharge as far as the outermost electrode part.

In addition, to secure the current supply path even if the divided electrode parts are partially disconnected and also to reduce the overall resistance of the electrode, it may be desirable to electrically connect the divided electrode parts. For instance, connectors of about 50 μm in width can be provided above the barrier ribs to connect the divided electrode parts to each other. According to this method, however, the precision of bonding the front panel FP and the back panel BP together becomes strict around 10-20 μm, which makes stable production more difficult. Furthermore, if fewer connectors are used, the overall resistance of the electrode increases. This causes a voltage drop, thereby making it difficult to drive the PDP.

DISCLOSURE OF INVENTION

The present invention was conceived in view of the problem described above, and aims to provide a gas discharge panel that has favorable display performance with high luminance and illumination efficiency.

Also, the present invention aims to provide a gas discharge panel which uses a display electrode structure divided into a plurality of parts without an increase in drive voltage. Furthermore, the present invention aims to provide a gas discharge panel that defies disconnections of divided electrode parts, has low-resistance electrodes, and is easy to drive.

The stated object can be achieved by a gas discharge panel including a first substrate and a second substrate, a plurality of display electrode pairs which are each made up of a sustain electrode and a scan electrode being formed on the first substrate, and the first substrate and the second substrate being set facing each other with a plurality of barrier ribs in between so as to form a plurality of cells, wherein at least one of the sustain electrode and the scan electrode includes: a plurality of line parts; and a discharge developing part which makes a gap between adjacent line parts smaller in areas corresponding to channels between adjacent barrier ribs than in areas corresponding to the barrier ribs.

The stated object can also be achieved by a gas discharge panel in which phosphor layers corresponding to three colors of red, green, and blue are formed one by one in a plurality of cells, and a plurality of display electrode pairs that are each made up of a sustain electrode and a scan electrode are arranged so as to cross the plurality of cells, wherein a width of each of the plurality of cells is determined according to luminance of a phosphor layer formed in the cell, the sustain electrode and the scan electrode each have (a) a plurality of line parts and (b) a connector part which connects at least two line parts out of the plurality of line parts in each of the plurality of cells, and a distance between the plurality of line parts, a main discharge gap, and a position of the connector part are set so that a discharge current waveform when driving the sustain electrode and the scan electrode has a single peak.

With this construction, each of the display electrodes 4 and 5 are made up of a plurality of line parts and at least one connector part. Such a display electrode has a smaller area than a conventional strip-shaped display electrode, with it being possible to decrease the electrode capacitance needed for discharge. In general, if a display electrode is simply made up of a plurality of separate line parts, discharge takes place in a discrete fashion. As a result, the discharge current waveform tends to have a plurality of peaks. This increases the discharge firing voltage, thereby causing an increase in power consumption. According to the present invention, on the other hand, the discharge current waveform has a single peak as explained above, and so the panel can be driven with a lower voltage. Therefore, the power consumption can be reduced when compared with the conventional panel. This benefits favorable illumination efficiency (drive efficiency).

Also, since the discharge current waveform has a single peak, a voltage drop which could affect the panel luminance or the illumination efficiency does not occur. Furthermore, stable discharge can be performed even if a rise time of a drive pulse becomes unstable. Thus, the gas discharge panel of the present invention can express a gray scale by pulse modulation with stability.

When the cell width differs for each of the colors of red, green, and blue, the discharge firing voltage differs too. This makes it difficult to produce a stable image display. This problem associated with different cell widths can be solved if the above display electrode structure is used. This further increases the effects of the present invention (i.e. high illumination efficiency and stable image display).

BEST MODE FOR CARRYING OUT THE INVENTION

An overall construction of a PDP to which the embodiments of the present invention relate is roughly the same as that of the conventional PDP described earlier. The features of the present invention mainly lie in a structure of a display electrode and its vicinity. Accordingly, the following description focuses on the display electrode.

(First Embodiment)

1-1. Structure of a Display Electrode

Figure 1:
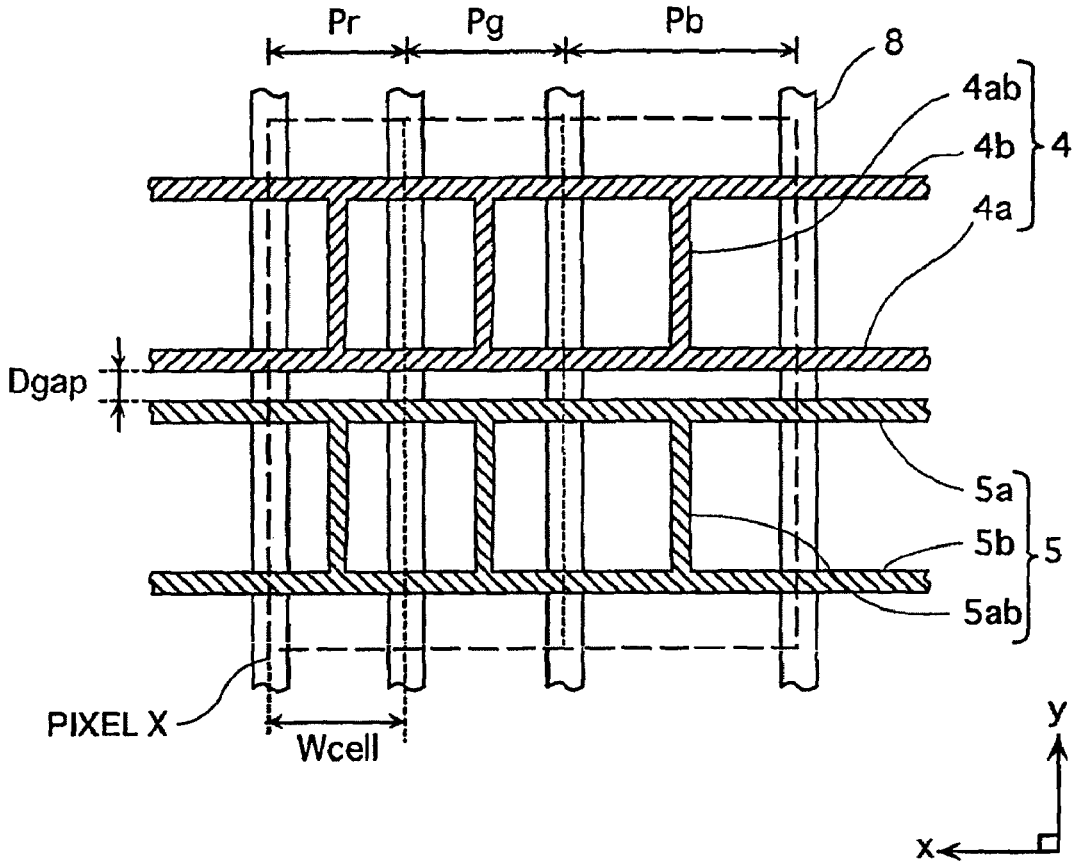
FIG. 1 is a plan view of display electrodes that are the first embodiment of the present invention.

FIG. 1 is a plan view of a display electrode pattern which is the first embodiment of the present invention.

In this embodiment, the phosphor layers 9 are formed such that phosphor materials of the three primary colors are applied in the x direction in the order of, for example, red, green, and blue (RGB), so as to extend in the y direction. An area where one pair of display electrodes 4 and 5 intersect one address electrode 11 is a discharge cell. Three cells of red, green, and blue which are adjacent in the x direction constitute one pixel X, as shown in FIG. 1.

The panel of the first embodiment is characterized in that at least one of the scan electrode 4 and the sustain electrode 5 which form each pair is divided into three parts. A part that is closest to the other electrode of the pair is a line part 4a (5a). The distance between the line part 4a (5a) and the other electrode is a main discharge gap Dgap. The main discharge gap Dgap represents the shortest distance between the scan electrode 4 and the sustain electrode 5. Discharge starts in this main discharge gap Dgap, and spreads throughout the scan electrode 4 and the sustain electrode 5. A part that is located far from the main discharge gap Dgap is a line part 4b (5b) which is a discharge end part that defines the spreading range of the discharge. A part that connects the line part 4a (5a) to the line part 4b (5b) is a connector part 4ab (5ab) which is a discharge developing part. This connector part is provided in each cell.

The connector part 4ab (5ab) is formed so that the gap between the line parts 4a and 4b (5a and 5b) is smaller in the areas corresponding to channels between adjacent barrier ribs 8 than in the areas corresponding to the barrier ribs 8 (in the present example, the gap between the line parts 4a and 4b (5a and 5b) in the areas corresponding to the channels between adjacent barrier ribs 8 is 0).

Cells that are adjacent in the x direction have the same line parts 4a and 4b (5a and 5b) but have separate connector parts 4ab (5ab).

Here, it is desirable to situate the connector part 4ab (5ab) at the center of each cell. In this way, a margin for displacements which may occur when bonding the front panel FP and the back panel BP together can be obtained.

If the construction of the back panel BP is not perpendicular to the barrier ribs 8, displacements in the direction along the barrier ribs 8 can be ignored. On the other hand, a margin for displacements in the x direction is determined by the width of the connector part 4ab (5ab).

Suppose a connector part that is perpendicular to the scan electrode 4 is provided in the area corresponding to the barrier rib 8, as in the case of Japanese Patent No. 2734405 mentioned earlier. Since the width of the connector part and the width of the barrier rib 8 are both about 50 μm, a displacement of around 10-20 μm can result in a change in characteristics.

In view of this, the width of the connector part 4ab (5ab) is set to be at least 100 μm smaller than the smallest distance Wcell between adjacent barrier ribs 8 in FIG. 1. This provides a margin of about ±50 μm for displacements in the x direction.

The use of the same line part 4a (5a) across the adjacent cells in the x direction has the following two effects. The first effect is to decrease the resistance of the line part 4a (5a). A construction of providing a separate discharge starting part for each individual cell is known as exemplified by Unexamined Japanese Patent Application Publication No. H08-250030. According to such a construction, however, the resistance of each discharge starting part increases. This causes a voltage drop, which increases the discharge firing voltage.

The second effect is to facilitate the bonding of the front panel FP and the back panel BP. As is clear from FIG. 1, there is no need to consider displacements of the line parts 4a and 4b (5a and 5b).

In the first embodiment, the widths Pr, Pg, and Pb of the cells in the x direction corresponding to the three colors of red, green, and blue are not uniform, as shown in FIG. 1 (i.e., Pr≦Pg≦Pb). The reason for this is given below. The phosphor layers 9R, 9G, and 9B for the three colors of red, green, and blue have different luminance.

Accordingly, to balance the luminance between the red, green, and blue cells, a cell corresponding to a phosphor layer which has relatively low luminance (the blue cell in the present example) is formed wider to increase the cell area, thereby ensuring sufficient luminance.

It should be noted here that although the luminance of the blue phosphor is usually lowest among the three colors of red, green, and blue, this may not be the case depending on specifications of a PDP.

In each cell between two adjacent barrier ribs 8, the scan electrode 4 (sustain electrode 5) is made up of two thin line parts 4a and 4b (5a and 5b) and a connector part 4ab (5ab) that electrically connects these two line parts.

The two line parts 4a and 4b (5a and 5b) are coupled together at both ends of the scan electrode 4 (sustain electrode 5) (not illustrated), so that the same voltage is applied to the two line parts.

As one example, the size of each part is the following. The cell width P in the y direction is 1.08 mm. The main discharge gap Dgap is 80 μm. The line part width in the y direction is 40 μm. The distance between the two line parts 4a and 4b (5a and 5b) is 80 μm. Each of the display electrodes 4 and 5 is made using a metal material (e.g. Ag or Cr/Cu/Cr). The use of Ag as the metal material allows the reflectivity to increase and the loss of visible light to be suppressed, and so contributes to higher illumination efficiency.

The above size and position of each part of the display electrode are determined so that the discharge current waveform when driving the PDP has a single peak to thereby deliver excellent illumination efficiency. To determine such a display electrode pattern that makes the discharge current waveform have a single peak, a method of varying the main discharge gap Dgap, the distance between the line parts, the position of the connector part, and the like while checking the waveform may be employed.

1-2. Specific Effects of the First Embodiment

Figure 2A:
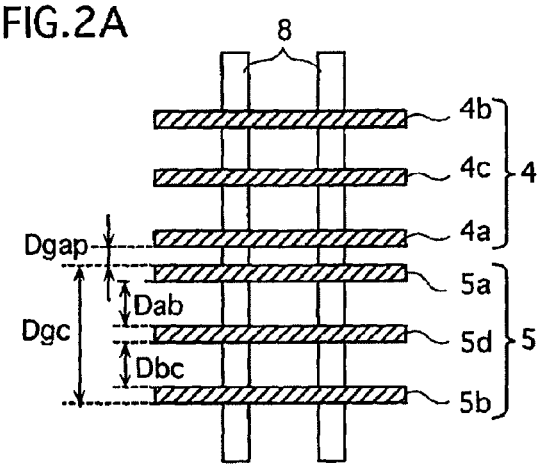
FIG. 2 shows changes in discharge current in each of when connector parts are provided and when connector arts are not provided.
Figure 2B:
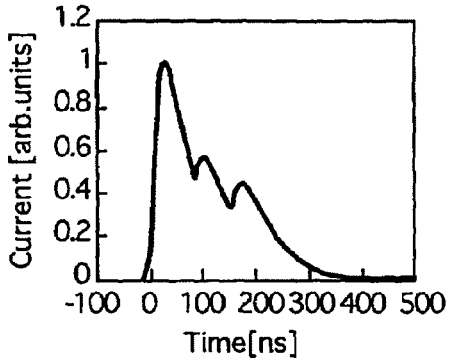
Figure 2C:
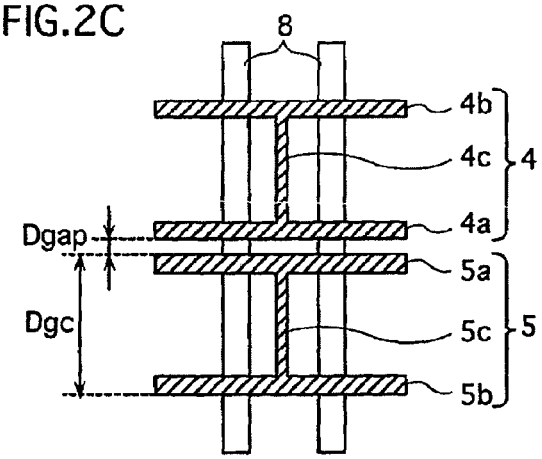
Figure 2D:
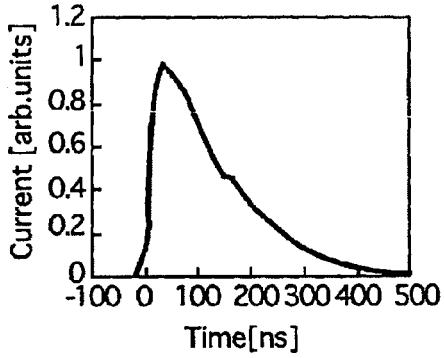

When a display electrode in a PDP has a plurality of line parts, usually a plurality of peaks occur in discharge current waveform. FIGS. 2A and 2B show a display electrode structure which includes only line parts and no connector parts and a discharge current waveform for this structure, respectively. FIGS. 2C and 2D show a display electrode structure which includes connector parts of the present invention and a discharge current waveform for this structure, respectively.

In both cases, discharge starts in the main discharge gap Dgap. The discharge that starts in the main discharge gap Dgap, i.e., the gap between the line parts 4a and 5a, grows spatially with time and eventually spreads throughout the display electrodes 4 and 5.

In FIG. 2A, the display electrodes 4 and 5 to which a discharge current is supplied each have a discrete structure, that is, a structure of being separated into isolated parts. Therefore, the discharge grows in a discrete fashion. As a result, a plurality of peaks appear in the discharge current waveform as shown in FIG. 2B.

The line parts such as 4b and 4d (5b and 5d) that are far from the main discharge gap Dgap perform discharge through the use of the priming of the discharge of the inner line part. This being so, if there is a substantial distance between line parts, the priming effect is difficult to reach. Unless strong discharge is generated, the discharge cannot reach the outermost line part. Hence the drive voltage needs to be raised.

In FIG. 2C, on the other hand, the growth of discharge is more continuous as can be understood from FIG. 2D, because the connector part 4c (5c) that connects the line parts 4a and 4b (5a and 5b) is present. The discharge that starts at the line part 4a (5a) grows through the connector part 4c (5c) to the line part 4b (5b). This growth is continuous, and so a lower drive voltage than that of FIG. 2A is sufficient.

The inventors found through experimentation that the voltage required by the structure of FIG. 2C was 3 to 5V lower than that required by the structure of FIG. 2A. Meanwhile, there was no substantial difference in panel luminance.

Each of the display electrodes 4 and 5 can be formed using a metal electrode or a transparent electrode whose major component is a metal oxide. To decrease resistance, however, it is desirable to form at least the line parts 4a and 4b (5a and 5b) using a metal electrode.

Here, the display electrode may be formed using a material which mainly contains silver. The use of silver enables the reflectivity to increase and the loss of visible light to be suppressed, thereby contributing to a higher visible light utilization ratio.

Discharge at a given peak of discharge current tends to be greatly affected by discharge that took place at its preceding peak of discharge current (priming effects by residual ions, metastable particles, and the like). In more detail, some discharge is affected by its preceding discharge in such a way that the voltage waveform deforms or the rise time of the drive pulse changes. Also, the luminance or the illumination efficiency changes due to a voltage drop and the like. Thus, if the discharge current waveform has a plurality of peaks, the gray scale control tends to become unstable. This poses a significant obstacle to producing a favorable full-color moving image display on a television receiver or similar.

According to the first embodiment, on the other hand, there is only one discharge current peak. Hence stable sustain discharge can be performed when compared with the case where a plurality of peaks occur. This enables the gray scale control by pulse modulation to be exercised with stability, with it being possible to ensure excellent display performance.

In the first embodiment, the discharge current waveform has a single peak. Accordingly, the discharge illumination waveform has a single peak, too.

In the first embodiment, the above display electrode pattern is applied to a construction where the cell width in the x direction differs for each color of red, green, and blue. By doing so, variations in discharge firing voltage among the three colors of red, green, and blue are eliminated. As a result, a stable image display can be produced.

Figure 3A:
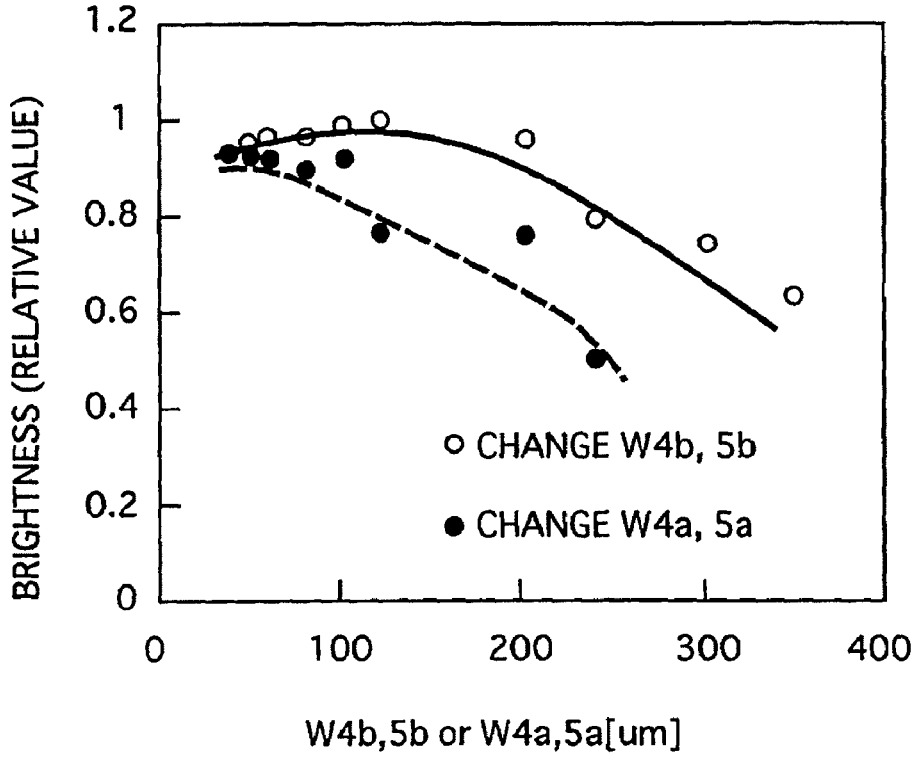
FIG. 3 shows changes in luminance when the widths of line parts are varied.

FIG. 3A is a graph showing the correlation between the widths of the line parts 4a, 4b, 5a, and 5b and the panel luminance. The widths of the line parts 4a, 4b, 5a, and 5b are denoted by W4a, W4b, W5a, and W5b respectively.

Figure 3B:
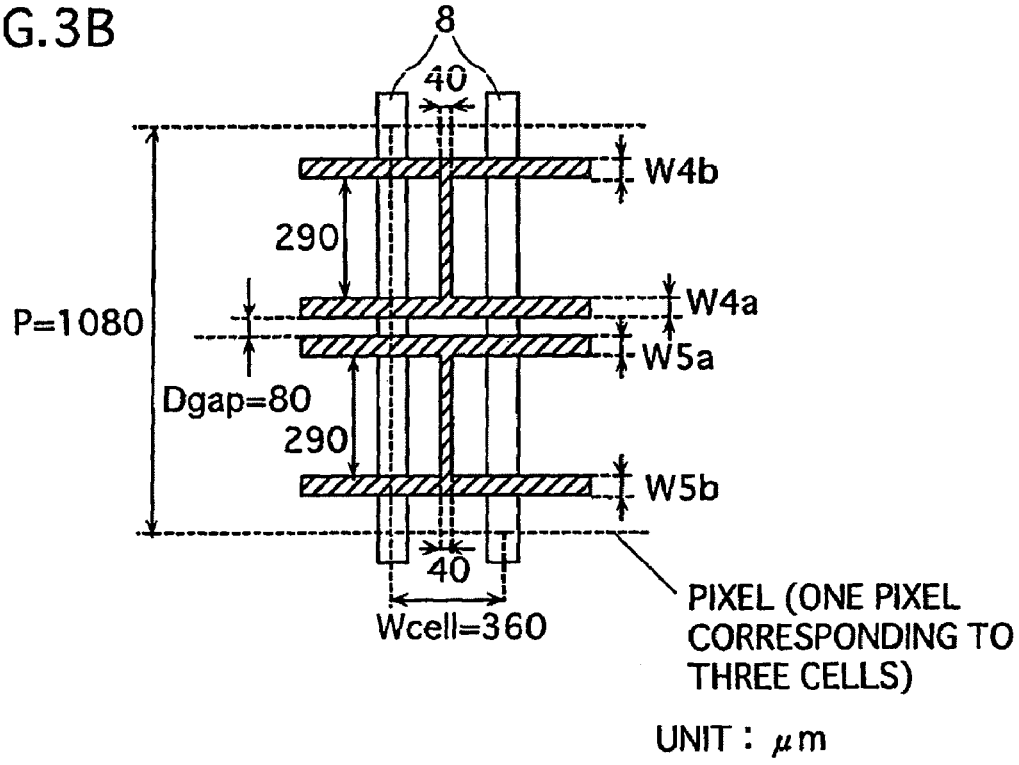

FIG. 3A shows measurement values when various parameters are set such that the connector part width is 40 μm, the distance between the line parts is 290 μm, the main discharge gap Dgap is 80 μm, and the cell width Wcell is 360 μm as shown in FIG. 3B.

As illustrated, the panel luminance begins to drop when the width W4b (W5b) of the line part 4b (5b) where the discharge substantially ends becomes 120 μm or more. This drop in panel luminance is mainly caused by a decrease in opening ratio due to the widened line part. Which is to say, the panel luminance depends on the cell opening ratio, i.e., the ratio of the line part area to the cell area.

When the width W4b (W5b) of the line part 4b (5b) which is the discharge end part is 120 μm, the line part 4b (5b) occupies about 40% of the cell area. Therefore, it is desirable to limit the area of the line part 4b (5b) to less than 40% of the cell area, in view of FIGS. 3A and 3B.

This factor needs to be taken into consideration when determining the width of each line part.

Thus, the PDP of the first embodiment achieves excellent display performance and illumination efficiency, by forming the display electrode 4 (5) from the line parts 4a and 4b (5a and 5b) and the connector part 4ab (5ab) to thereby reduce the electrode area and also ensure a single-peak discharge current waveform.

In this specification, a single-peak discharge current waveform may include such a discharge current waveform that has a peak other than the maximum peak but its value is no more than 10% of the value of the maximum peak.

1-3. Manufacturing Method for the PDP

One example method for manufacturing the PDP of the first embodiment is explained below. This manufacturing method is also applicable to PDPs of the other embodiments which are described later.

1-3-1. Manufacture of the Front Panel

A front panel glass is made of soda lime glass and has a thickness of about 2.6 mm. Display electrodes are formed on this front panel glass. A method of forming display electrodes using metal electrodes which include a metal material (Ag) (thick film formation method) is shown below as one example.

A photoresist (photodegradable resin) is mixed with a metal (Ag) powder and an organic vehicle to create a photosensitive paste. This photosensitive paste is applied to one main surface of the front panel glass, and a mask having a desired display electrode pattern is placed on top of that. Light is applied onto the mask to develop and bake (a baking temperature of around 590-600° C.). In this way, a line width as small as about 30 μm can be realized when compared with a conventional screen printing method whose limit is a line width of 100 μm. Here, other metal materials such as Pt, Au, Ag, Al, Ni, Cr, tin oxide, and indium oxide may instead be used.

Also, the electrode formation is not limited to the above method. For instance, electrodes may be formed by depositing an electrode material using evaporation, sputtering, or the like and then executing etching.

Next, a protective layer with a thickness of about 0.3 to 1 μm is formed on a dielectric layer using evaporation, CVD (chemical-vapor deposition), or the like. Magnesium oxide (MgO) is preferably used for the protective layer.

This completes the front panel.

1-3-2. Manufacture of the Back Panel

A back panel glass is made of soda lime glass and has a thickness of about 2.6 mm. A conductive material whose major component is Ag is applied to one main surface of the back panel glass in stripes at a predetermined pitch using screen printing, to form address electrodes with a thickness of about 5 μm. Here, to keep with the requirements for a 40-inch NTSC or VGA television, the distance between the adjacent address electrodes is set to be no greater than around 0.4 mm.

Following this, a lead glass paste is applied to the entire surface of the back panel glass on which the address electrodes have been arranged, so as to assume a thickness of about 20 to 30 μm. The result is baked to form a dielectric film.

Next, barrier ribs with a height of about 60 to 100 μm are formed in the gaps between the adjacent address electrodes on the dielectric film, using the same lead glass material as the dielectric film. The barrier ribs can be formed, for example, by repeatedly screen-printing a paste which includes the above glass material and then baking it.

Once the barrier ribs have been formed, the phosphor inks of the three colors of red (R), green (G), and blue (B) are applied one at a time to the side faces of the barrier ribs and the exposed surface of the dielectric film between the barrier ribs. The result is dried and baked to form phosphor layers.

Examples of phosphor materials typically used for PDPs are given below:

Red phosphor: $(Y_xGd_{1-x})BO_3:EU^{3+}$

Green phosphor: $Zn_2SiO_4:Mn^{3+}$

Blue phosphor: $BaMgAl_{10}O_{17}:Eu^{3+}$ (or $BaMgAl_{14}O_{23}:Eu^{3+}$)

A powder with an average particle diameter of about 3 μm may be used for each phosphor material. Though there are several methods for applying phosphor ink, this embodiment employs a known meniscus method that expels phosphor ink from a fine nozzle while forming a meniscus (a cross-linking due to surface tension). This method has an advantage of evenly applying phosphor ink to desired parts. However, it should be obvious that the present invention is not limited to this method. Other methods such as screen printing are also applicable.

This completes the back panel.

Though the front panel glass and the back panel glass are made of soda lime glass in this embodiment, this is a mere example of material that can be used for the front panel glass and the back panel glass, which may be formed from other materials.

1-3-3. Completion of the PDP

The front panel and the back panel manufactured in this way are sealed together using sealing glass. Following this, the discharge spaces are evacuated to produce a high vacuum (around $1.1\times10^{-4}$ Pa), and discharge gas such as an Ne—Xe mixture, an He—Ne—Xe mixture, or an He—Ne—Xe—Ar mixture is introduced into the discharge spaces at a predetermined pressure (e.g. $2.7\times10^{5}$ Pa).

1-4. Modifications to the First Embodiment

Figure 4:
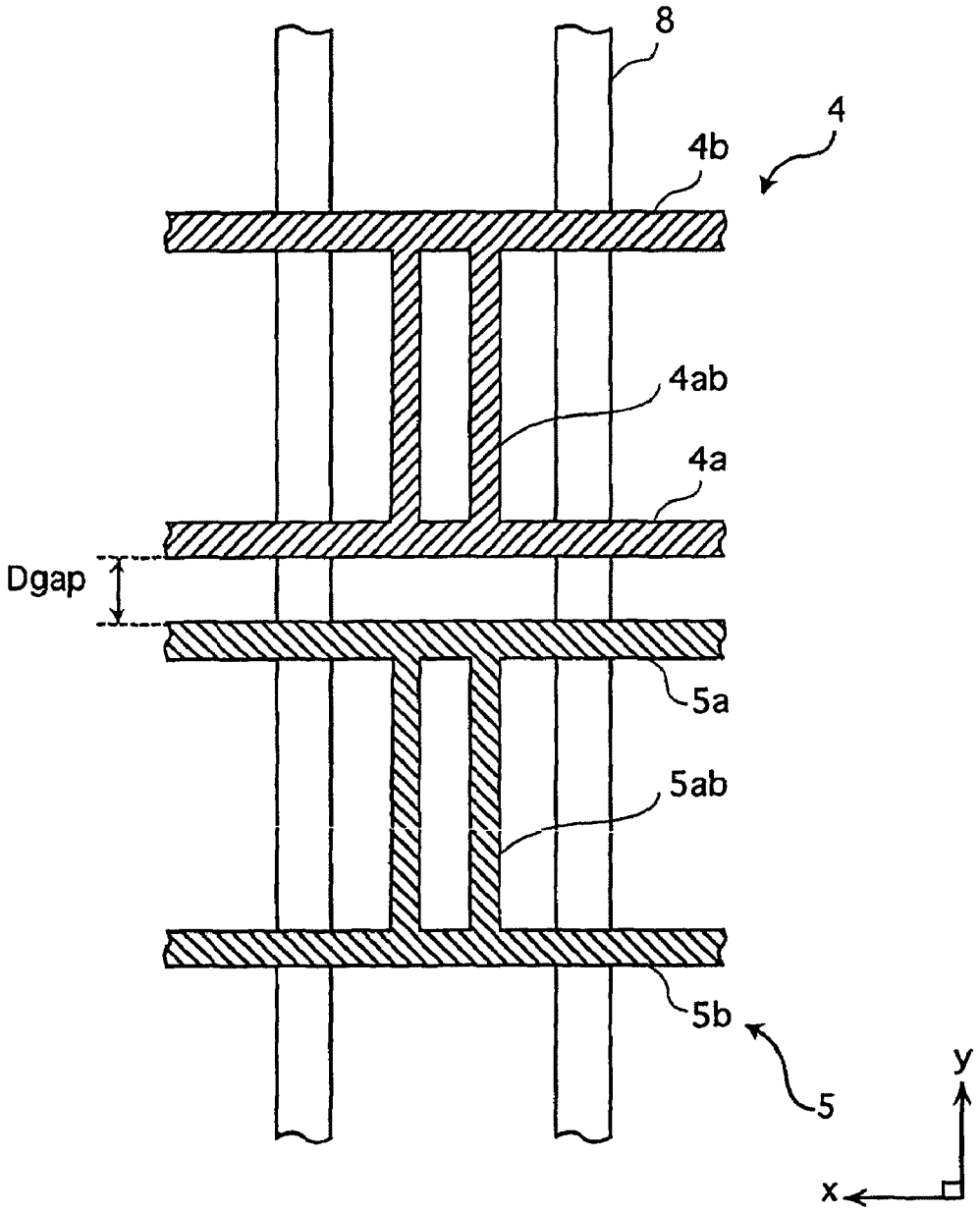
FIG. 4 is a plan view of display electrodes that are a modification to the first embodiment.

The first embodiment describes the case where one connector part 4ab (5ab) is provided in each cell, but this is not a limit for the invention. For instance, two connector parts 4ab (5ab) may be provided in each cell, as shown in FIG. 4 (modification 1-1). This allows a wider discharge space to be used for discharge.

In the first embodiment, the discharge which starts at the line part 4a (5a) grows through the connector part 4ab (5ab) and eventually reaches the line part 4b (5b).

However, it is difficult for the discharge to reach a space that is far from all of the line part 4a (5a), the line part 4b (5b), and the connector part 4ab (5ab), since the electric field strength of the space is low. This causes the illumination intensity to decrease. To minimize such a space, a plurality of connector parts 4ab (5ab) are provided in this modification. In so doing, a wider space can be used for discharge, with it being possible to increase the panel luminance.

Another effect produced by this modification is to strengthen the current supply capacity of the connector part 4ab (5ab). By providing two connector parts 4ab (5ab) in each cell as shown in FIG. 4, the current supply capacity is doubled when compared with the display electrode structure of FIG. 1. This facilitates the growth of discharge, and enables the PDP to be driven with a lower voltage. The priming increases due to these factors, thereby easing the growth of discharge.

Note here that the shape of the connector part 4ab (5ab) may be other than a straight line.

Figure 5:
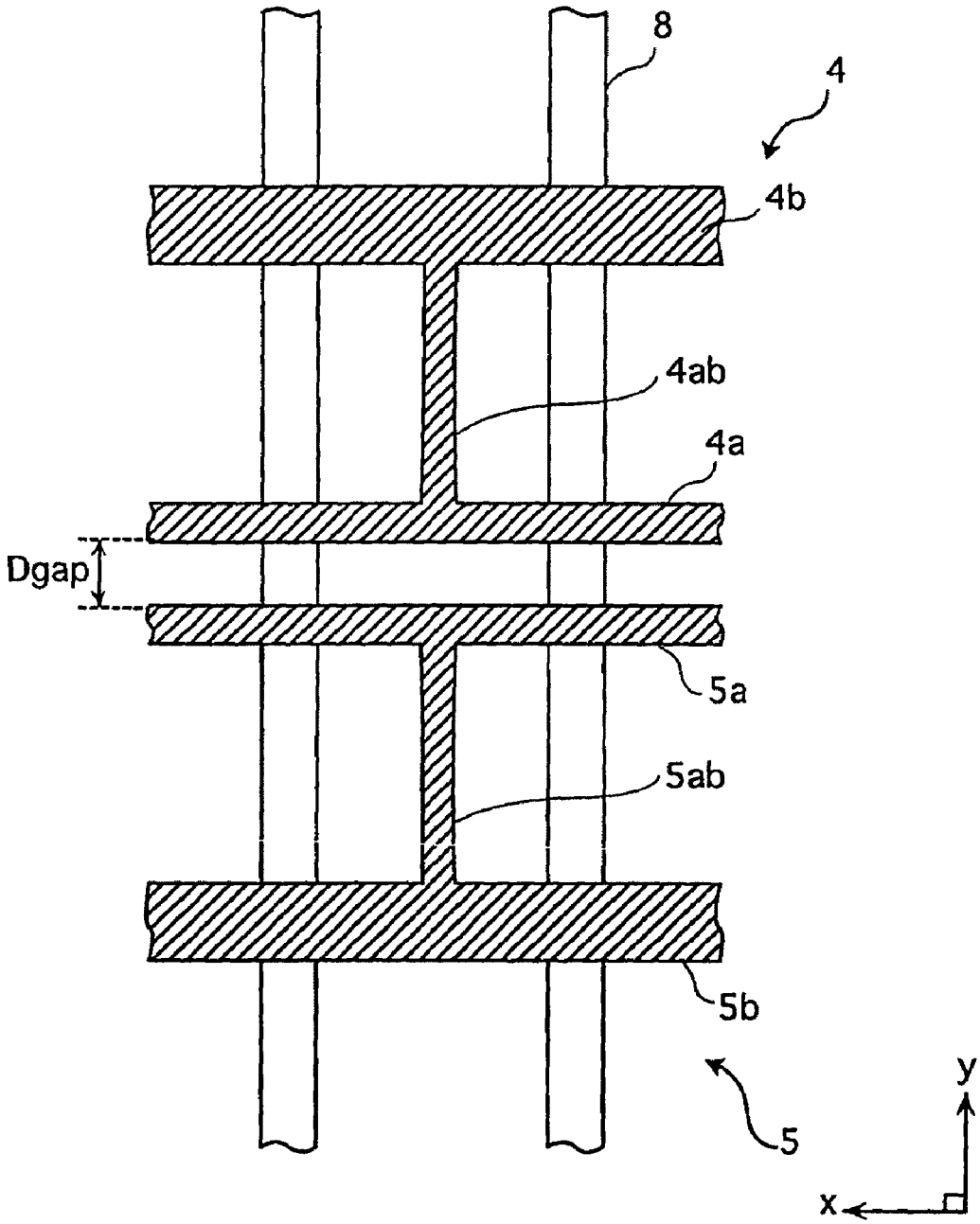
FIG. 5 is a plan view of display electrodes that are a modification to the first embodiment.

Also, the widths of the line parts 4a and 4b (5a and 5b) may not be the same. For example, one line part (4b (5b) in this example) may be set wider than the other line part, as shown in FIG. 5 (modification 1-2).

In general, the electric resistance of the scan electrode 4 (sustain electrode 5) can be reduced by widening the electrode area. However, this causes the light emitted from a phosphor excited by ultraviolet light due to discharge to be blocked, which results in a drop in luminance.

On the other hand, if the electrode area is widened, the electric resistance decreases and the flow of current is eased. In addition, the discharge area in the discharge space widens. Accordingly, the discharge current increases, which contributes to higher luminance.

These factors indicate that the maximum luminance can be obtained depending on the display electrode area.

On the whole, it is desirable to maximize the electrode area to decrease the resistance, within a range where the maximum luminance can be obtained. This being so, by increasing the electrode area in a part which has low luminance in the discharge space, the blockage of visible light can be effectively minimized.

The discharge starts at the line part 4a (5a) and grows towards the line part 4b (5b). Therefore, the line part 4a (5a) and its vicinity illuminate for a longest time, and so has high luminance. Meanwhile, the line part 4b (5b) has relatively low luminance.

Accordingly, by widening the area of the line part 4b (5b) which has low luminance, it is possible to decrease the resistance while maintaining the panel luminance.

According to this modification, the electrode area is widened to an appropriate extent to reduce the electric resistance. This assists in a favorable flow of current, with it being possible to improve the panel luminance. Here, it is preferable to widen a line part which is relatively far from the main discharge gap Dgap, in order to reduce the power required to start the discharge.

Figure 6:
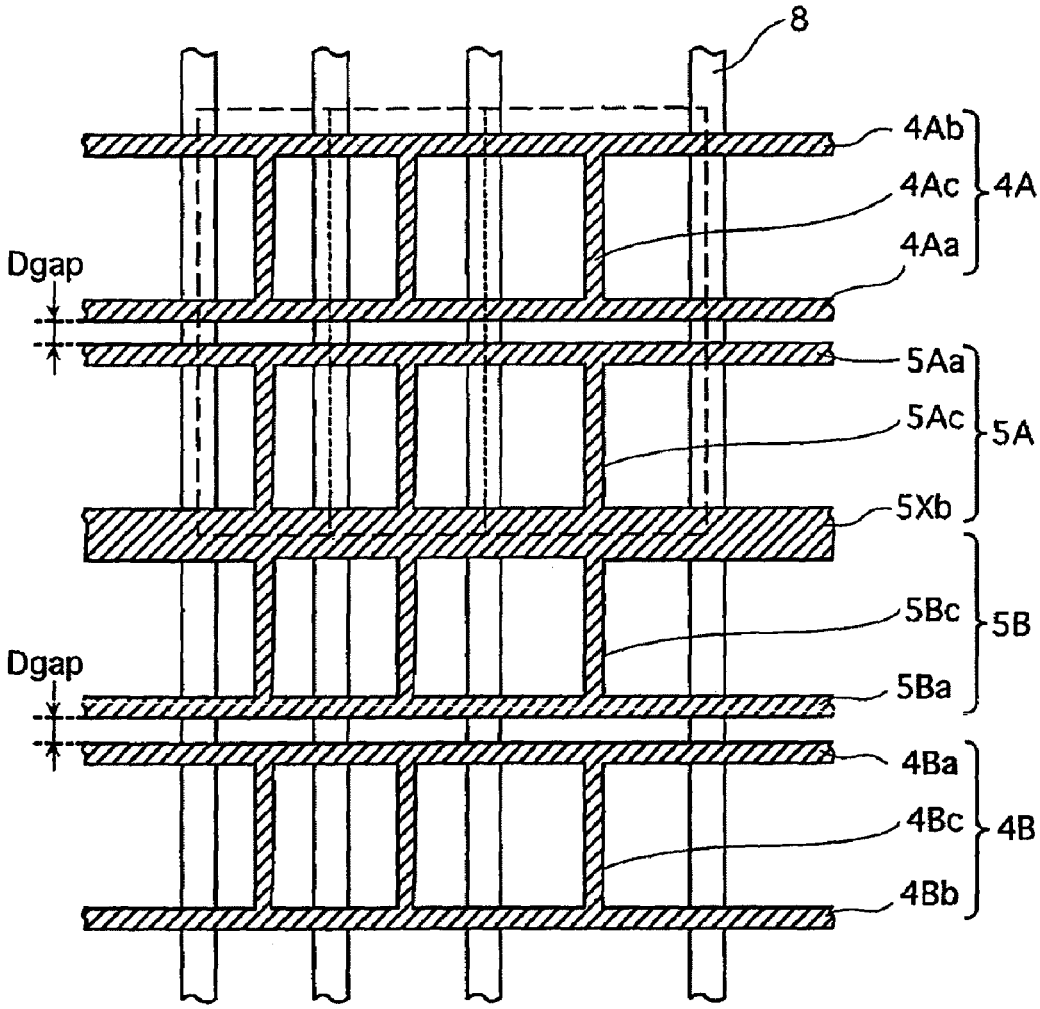
FIG. 6 is a plan view of display electrodes that are a modification to the first embodiment.

FIG. 6 shows another arrangement of a pair of display electrodes (modification 1-3). In the drawing, two cells adjacent in the y direction correspond to an X electrode, a Y electrode, and an X electrode arranged in this order, where the two X electrodes share the same Y electrode.

Here, Y electrodes 5A and 5B at the center are paired respectively with an upper X electrode 4A and a lower X electrode 4B. The Y electrodes 5A and 5B act as a single Y electrode electrically.

Figure 7:
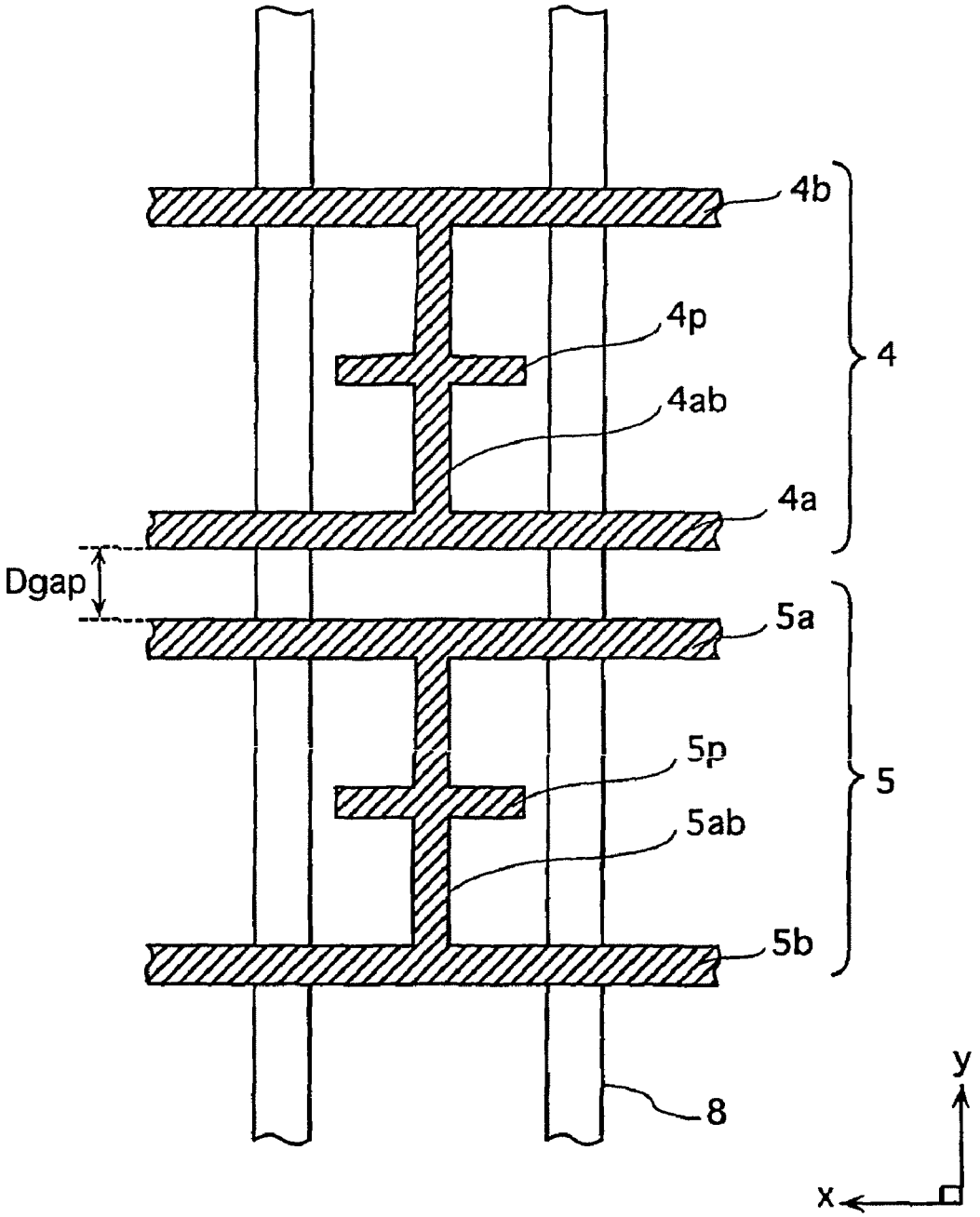
FIG. 7 is a plan view of display electrodes that are a modification to the first embodiment.

Also, a discharge accelerating part 4p (5p) which is in parallel with the line parts 4a and 4b (5a and 5b) may be provided in each cell so as to intersect the connector part 4ab (5ab) at the right angle, as shown in FIG. 7 (modification 1-4).

According to this modification, the discharge which starts at the line part 4a (5a) spreads in the y direction along the connector part 4ab (5ab), and at the same time spreads in the x direction along the discharge accelerating part 4p (5p). Thus, the discharge effectively spreads in the discharge space between the line parts 4a and 4b (5a and 5b), as a result of which the luminance of the entire cell increases.

Also, this modification produces a phenomenon in which the discharge grows in the order of the line part 4a (5a), the discharge accelerating part 4p (5p), and the line part 4b (5b). This has an effect of widening the discharge space, with it being possible to improve the luminance.

Figure 8:
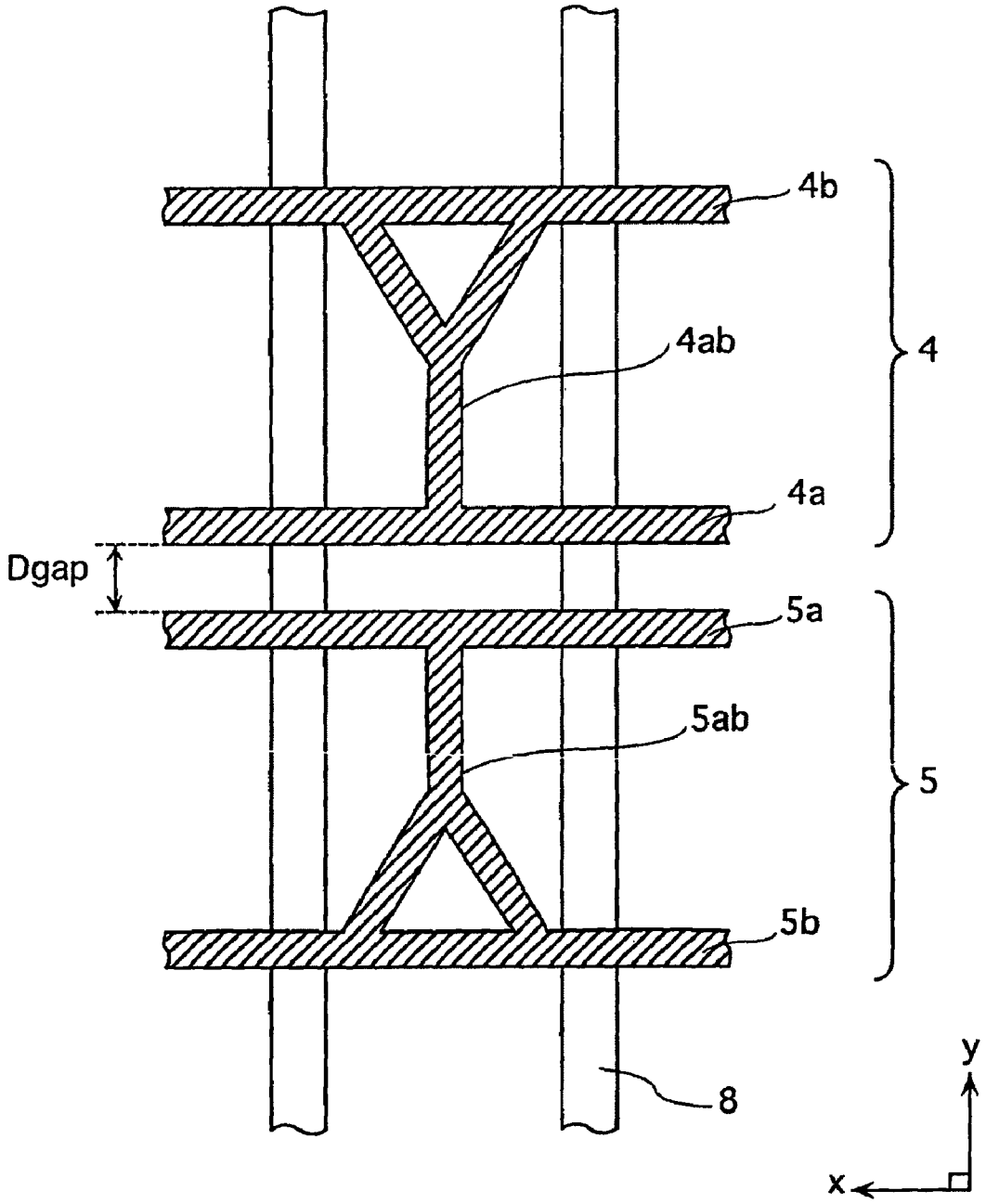
FIG. 8 is a plan view of display electrodes that are a modification to the first embodiment.

Similar effects can be obtained by a display electrode pattern shown in FIG. 8 (modification 1-5). In the drawing, the connector part 4ab (5ab) is divided into two parts to spread towards the line part 4b (5b).

Figure 9:
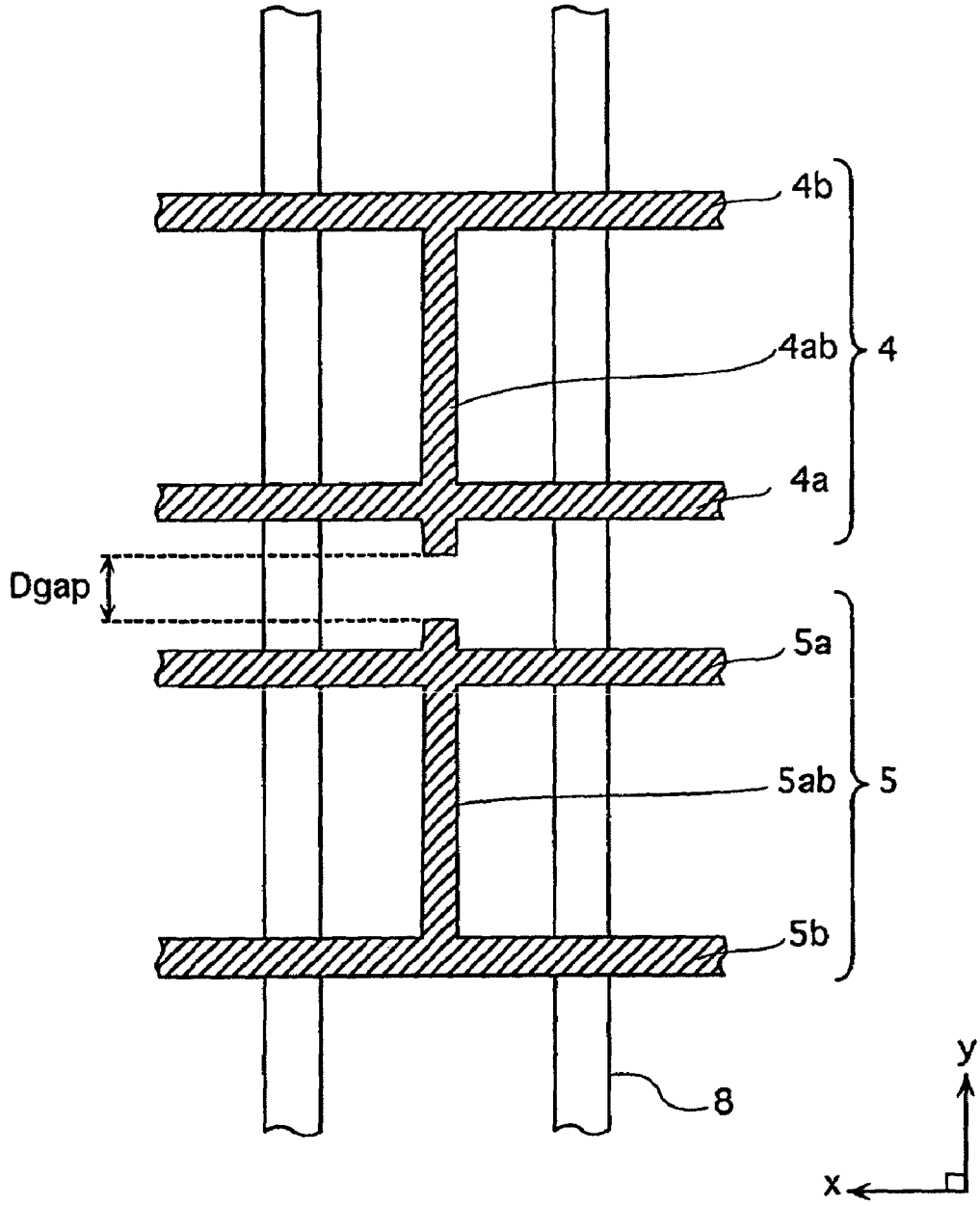
FIG. 9 is a plan view of display electrodes that are a modification to the first embodiment.

Also, a projection may be formed on one side of the line part 4a (5a) facing the other display electrode of the pair so as to extend from the connector part 4ab (5ab), as shown in FIG. 9 (modification 1-6). This being the case, the discharge is performed between these facing projections. According to this construction, the discharge starts between the projections extending from the connector parts 4ab and 5ab, with it being possible to reduce the power required to start the discharge.

(Second Embodiment)

2-1. Structure of a Display Electrode

The second embodiment is fundamentally based on the first embodiment, but is characterized in that a display electrode is made up of three or more line parts 4a, 4b, . . . and connector parts 4ab, 4b , . . . which are arranged in he y direction in a straight line to connect the line parts.

Figure 10:
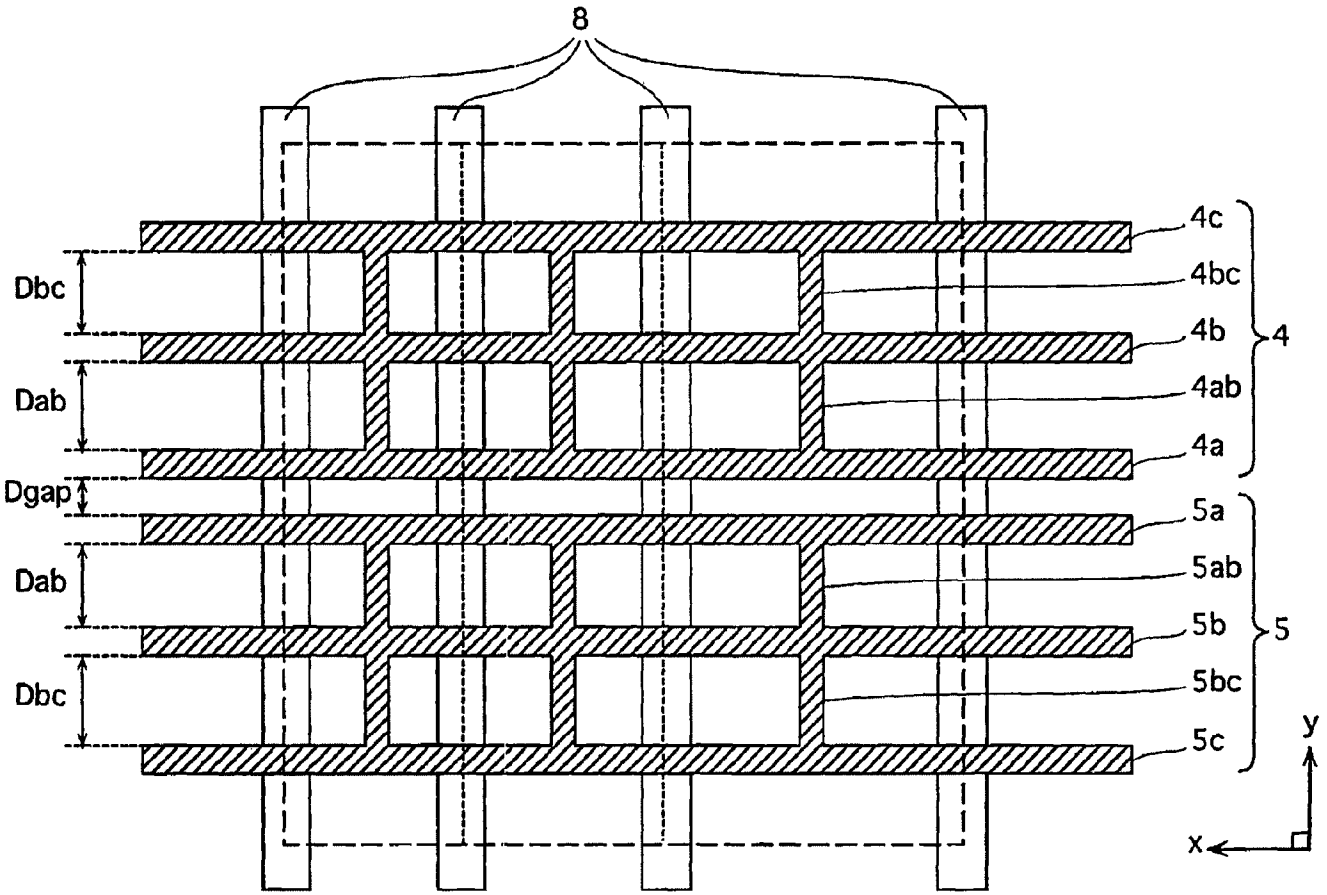
FIG. 10 is a plan view of display electrodes that are the second embodiment of the present invention.

FIG. 10 shows an example of the display electrode structure of the second embodiment. In the drawing, the scan electrode 4 (sustain electrode 5) has three line parts 4a-4c (5a-5c) that are connected by connector parts 4ab and 4bc (5ab and 5b) arranged in a straight line in the y direction. The distance Dab between the line parts 4a and 4b (5a and 5b) is equal to the distance Dbc between the line parts 4a and 4c (5a and 5c). It is preferable for Dab and Dbc to be larger than the main discharge gap Dgap, to increase the opening ratio. As a result, high luminance can be obtained, and the voltage can be further reduced.

As one example, the size of each part is set as follows. The pixel pitch is 1080 μm, the line part width is 40 μm, the main discharge gap Dgap is 80 μm, and the distance between adjacent line parts is 100 μm.

The panel of the second embodiment is characterized in that two or more connector parts 4ab, 4bc, . . . (5ab, 5bc, . . . ) are formed for the display electrode 4 (5) in each cell, so as to be situated in the display area of the cell sandwiched by the adjacent barrier ribs 8. In FIG. 10, the connector parts 4ab and 4bc (5ab and 5bc) are provided for the scan electrode 4 (sustain electrode 5) in each cell. In other words, two connector parts are provided for the scan electrode 4 (sustain electrode 5) in each cell.

It is desirable to position the connector parts 4ab and 4bc (5ab and 5bc) at the center of each cell. In this way, a margin for displacements which may occur when sealing the front panel FP and the back panel BP together can be obtained. Suppose a connector part is positioned perpendicular to the x direction as in the case of Japanese Patent No. 2734405. Since the connector part width is 50 μm and the barrier rib width is about 60 μm, a displacement of around 10-20 μm can result in a change in characteristics. On the other hand, if a connector part is positioned at the center of the cell as in this embodiment, a margin corresponding to the difference between the cell width and the connector part width is secured. Suppose the pixel pitch is 1080 μm×1080 μm. When the cell width in the x direction is about 300 μm and the connector part width is 40 μm, then a margin of about 260 μm (±130 μm) can be secured.

Such an effort of securing a margin for displacements which can occur in the sealing process may be dispensed with if a connector part is placed irrespective of the cell width or is placed only once in several tens of cells. However, such a regular arrangement may appear to be some kind of pattern to the human eye when looked at from the display plane side. Conversely, a completely random arrangement is inefficient in terms of design. According to the present invention, the connector part pitch is high, so that the electric resistance of the whole display electrode is reduced and the connector parts will not appear to form some kind of pattern to the human eye.

Note that the size of each part in the second embodiment can be determined in the same way as the first embodiment.

The display electrode structure shown in FIG. 10 delivers the same effects as the first embodiment. Which is to say, the discharge current waveform has a single peak, and the drive voltage is reduced.

2-2. Modifications to the Second Embodiment

Figure 11:
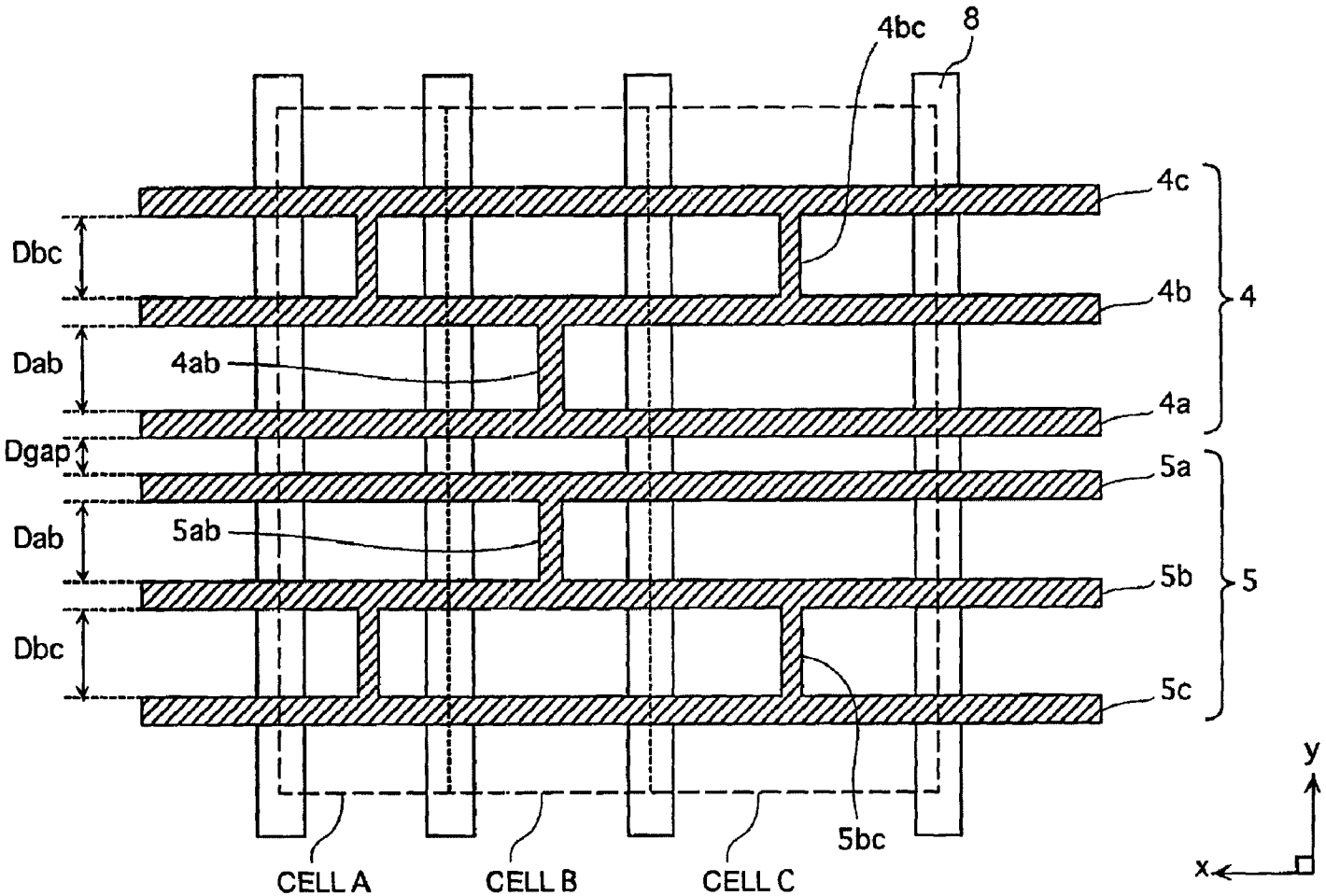
FIG. 11 is a plan view of display electrodes that are a modification to the second embodiment.

The second embodiment describes the case where the connector parts 4ab, 4bc, . . . (5ab, 5bc, . . . ) are arranged in a straight line to connect the line parts 4a, 4b, 4c, . . . (5a, 5b, 5c, . . . ). However, the present invention is not limited to such. For instance, the line parts may be connected by the connector parts so as to form a mesh, as shown in FIG. 11 (modification 2-1). In the drawing, cells A, B, and C correspond to the red, green, and blue phosphor layers, respectively. This being so, the green phosphor layer corresponding to cell B has higher luminance than the blue phosphor layer corresponding to cell C, and cell C is set wider than cell B. In general, when the cell width is smaller, the movement of electrons is restricted by the barrier ribs on both sides, which makes it difficult for the discharge to grow in the direction away from the main discharge gap Dgap. Therefore, to effectively spread the discharge from the main discharge gap Dgap, it is desirable to provide a connector part closer to the main discharge gap Dgap when the cell width is smaller. By doing so, the discharge characteristics such as the discharge voltage can be made uniform, even when the cell pitch is not uniform.

As shown in FIG. 11, it is desirable to provide a connector part closer to the main discharge gap Dgap, when the luminance of the corresponding phosphor layer is relatively high (cell B in this example). Meanwhile, it is desirable to provide a connector part farther from the main discharge gap Dgap, when the luminance of the corresponding phosphor layer is relatively low (cell A and cell C in this example).

The reason for this is given below. In the cell which is wider in the x direction (cell C), the capacitance of the display electrode 4 (5) near the main discharge gap Dgap which is necessary for starting the discharge is larger than in the cell which is narrower in the x direction (cells A and B). This being so, if the connector part is located farther from the main discharge gap Dgap, this capacitance can be reduced when compared with the case where the connector part is located nearer the main discharge gap Dgap. In addition, a larger amount of visible light can be obtained at the start of the discharge.

In the narrower cell, on the other hand, the cell area is smaller and so the influence of the capacitance of the display electrode is relatively low. Therefore, the connector part can be positioned more freely. As one example, the connector part 4ab (5ab) may be provided in the cell with sufficient phosphor luminance (cell B), whereas the connector part 4bc (5bc) may be provided in the cell which needs to ensure a certain amount of phosphor light emission (cell A).

This modification is made in consideration of these factors, with it being possible to improve the luminance and the illumination efficiency.

Figure 12:
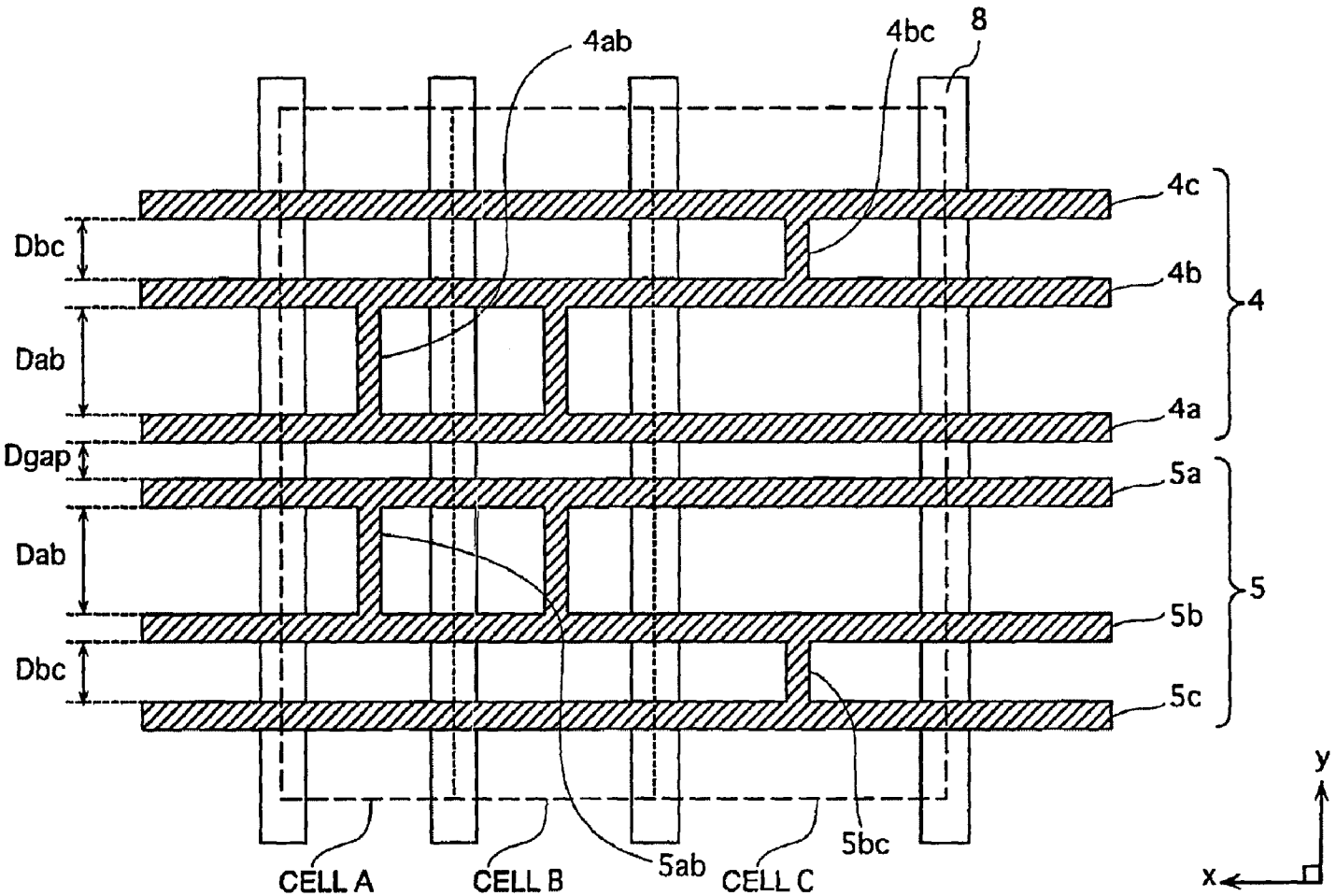
FIG. 12 is a plan view of display electrodes that are a modification to the second embodiment.

Similar effects can be delivered by a display electrode structure shown in FIG. 12 (modification 2-2). In this modification, the distance Dab between the line parts 4a and 4b (5a and 5b) is not equal to the distance Dbc between the line parts 4a and 4c (5a and 5c).

This being so, a connector part is provided between the line parts with a larger distance (Dab in FIG. 12) in cells A and B which each have a smaller cell area. Meanwhile, a connector part is provided between the line parts with a smaller distance in cell C which has a larger cell area.

This structure where Dab and Dbc are different allows visible light to be extracted more effectively onto the display plane.

Here, there may be a concern that the operating voltage could differ in each cell when the connector part is placed in a different position in each cell. If Dab and Dbc are the same as in FIG. 10, varying the position of the connector part for each cell hardly causes a variation in operating voltage of each cell. However, if Dab and Dbc are different as in FIG. 12, the cell which has the connector part positioned between the line parts with the larger distance (cell A in FIG. 12) can be driven with a voltage which is several volts lower. This causes a variation for each cell.

Also, the drive voltage of each cell can change by several volts due to the factors relating to the volume of the discharge space, such as the cell area and the shape of the phosphor layer. Accordingly, for a cell which requires a high drive voltage like cells A and B shown in FIG. 12, an electrode structure which can be driven with a lower voltage is adopted to thereby suppress a variation in drive voltage for each cell.

In FIG. 12, cell C has a large cell area whilst cell A has a small cell area. In this way, the luminance of the three colors of red, green, and blue is appropriately balanced to produce a white color with a desired color temperature. Usually the blue cell is widened to increase the blue luminance so as to produce a white color with a high color temperature. In such a case, the drive voltage of cell C becomes lower than the drive voltage of cell A. Accordingly, the connector part 4ab (5ab) is provided between the line parts 4a and 4b (5a and 5b) in cell A, to decrease the drive voltage. As a result, the drive voltage of cell A can be made roughly equal to the drive voltage of cell C.

Though each of the display electrode 4 and 5 has three line parts in this example, it should be obvious that the display electrode may have more than three line parts.

Figure 13:
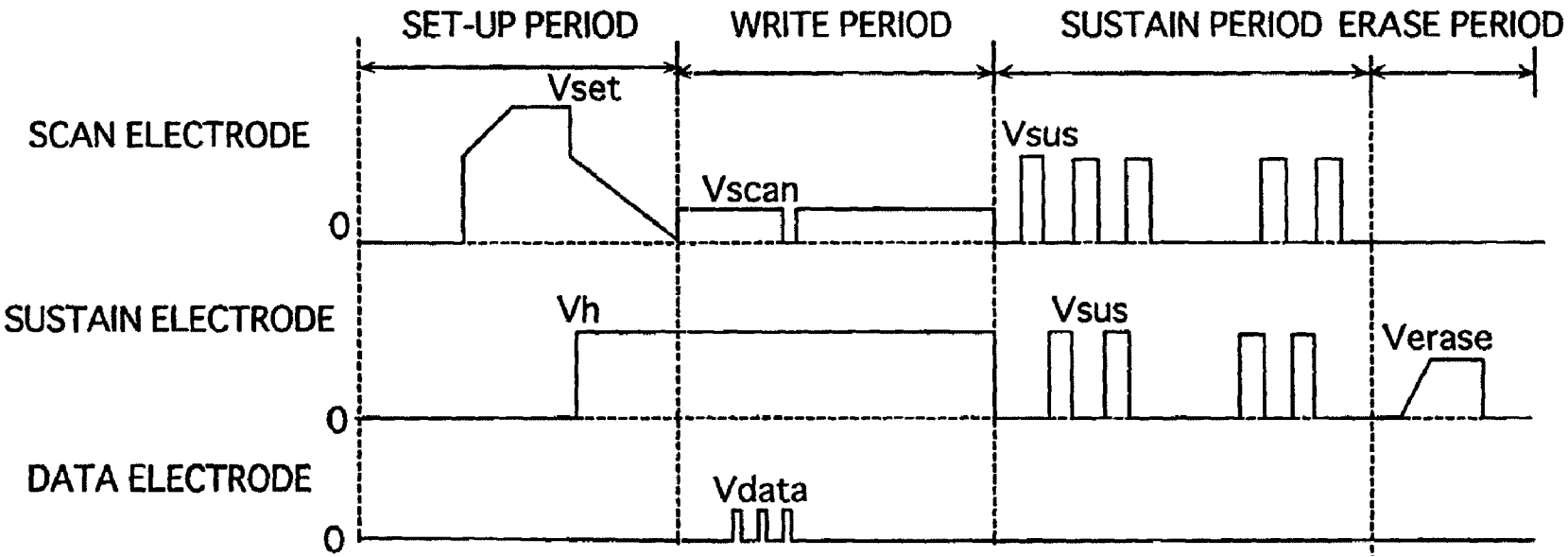
FIG. 13 shows shapes of pulses that are applied during ramp discharge.

Also, the distance between the line parts 4a and 4b (5a and 5b) is set larger than the distance between the line parts 4a and 4c (5a and 5c) in this modification. Accordingly, the connector part 4ab (5ab) is longer than the connector part 4bc (5bc). In so doing, a large amount of visible light can be produced in the discharge which occurs near the main discharge gap Dgap. By adopting the display electrode structure of the present invention to a drive method which applies a voltage of a waveform having a slope (see FIG. 13) to the scan electrodes in the set-up period, stable write discharge can be performed. As one example, the voltage change of the slope is preferably ±10 V/μs.

The above effect can be achieved for the following reason.

In general, the sloped voltage applied in the set-up period is extremely weak. Therefore, even if the discharge voltage differs for each cell, a wall charge can be accumulated close to the discharge firing voltage in every cell. This wall charge can be used to help the write discharge occur. However, since this discharge generated in the set-up period is weak, it will not grow throughout the cell if the electrode structure is discrete. This makes it difficult to accumulate a sufficient wall charge, with there being a danger that a discharge failure may occur to thereby induce a degradation in image.

According to the modification 2-2, however, the weak discharge generated in the main discharge gap Dgap can be easily spread to the outermost line part of the cell due to the presence of the connector part. As a result, a sufficient wall charge is accumulated, with it being possible to perform stable write discharge.

The details of ramp discharge are described in "Plasma Display Device Challenges", ASIA DISPLAY 98, pp.15-27.

Also, the position of the connector part may be changed according to the discharge characteristics of the phosphor. In doing so, it is possible to ensure uniform write discharge characteristics of each cell.

Figure 14:
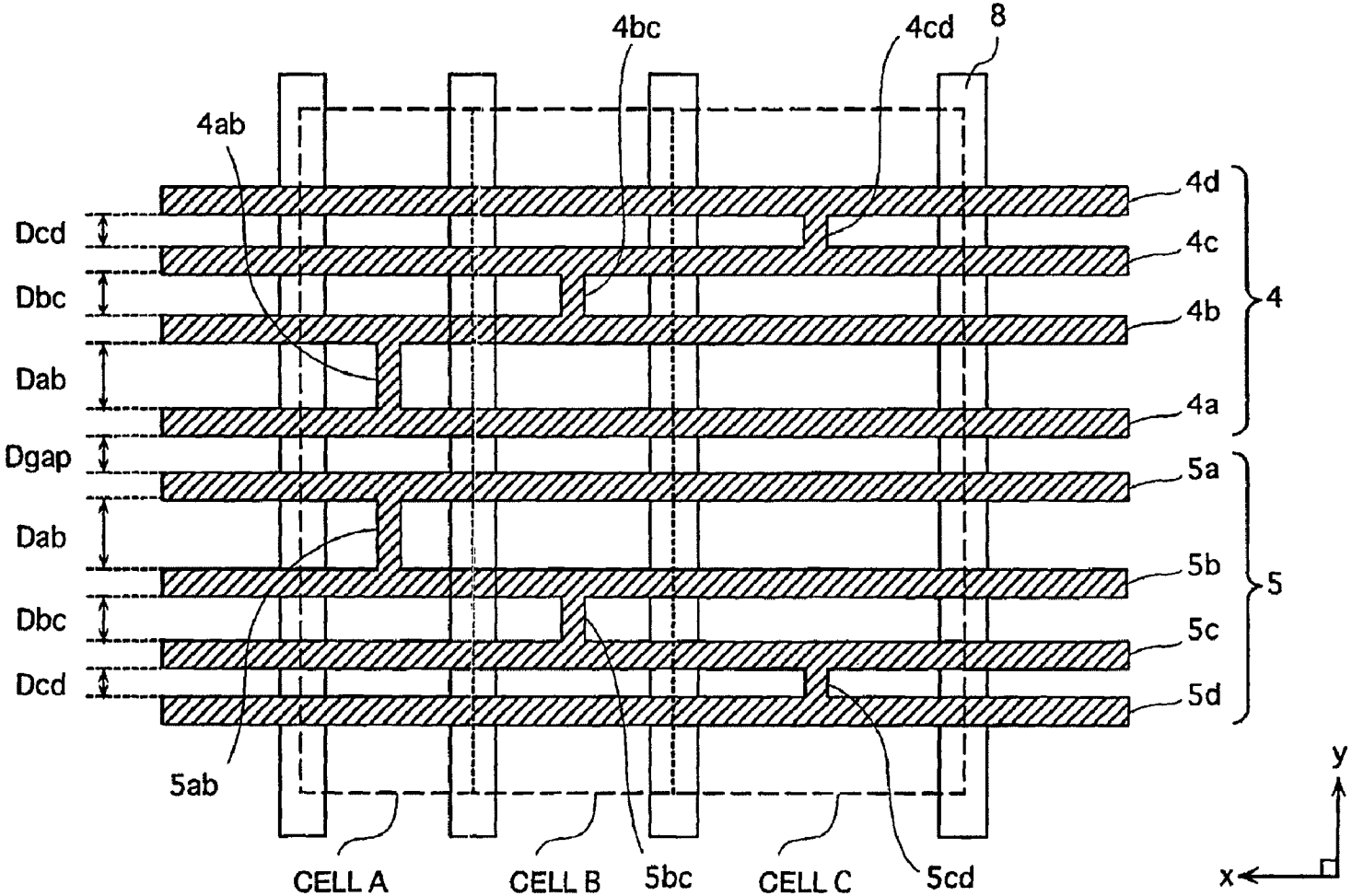
FIG. 14 is a plan view of display electrodes that are a modification to the second embodiment.

The modification 2-2 may be further modified to include four line parts, as shown in FIG. 14. When the number of line parts is increased in this way, the number of gaps between line parts increases too. Hence the connector parts can be positioned more freely.

Figure 15:
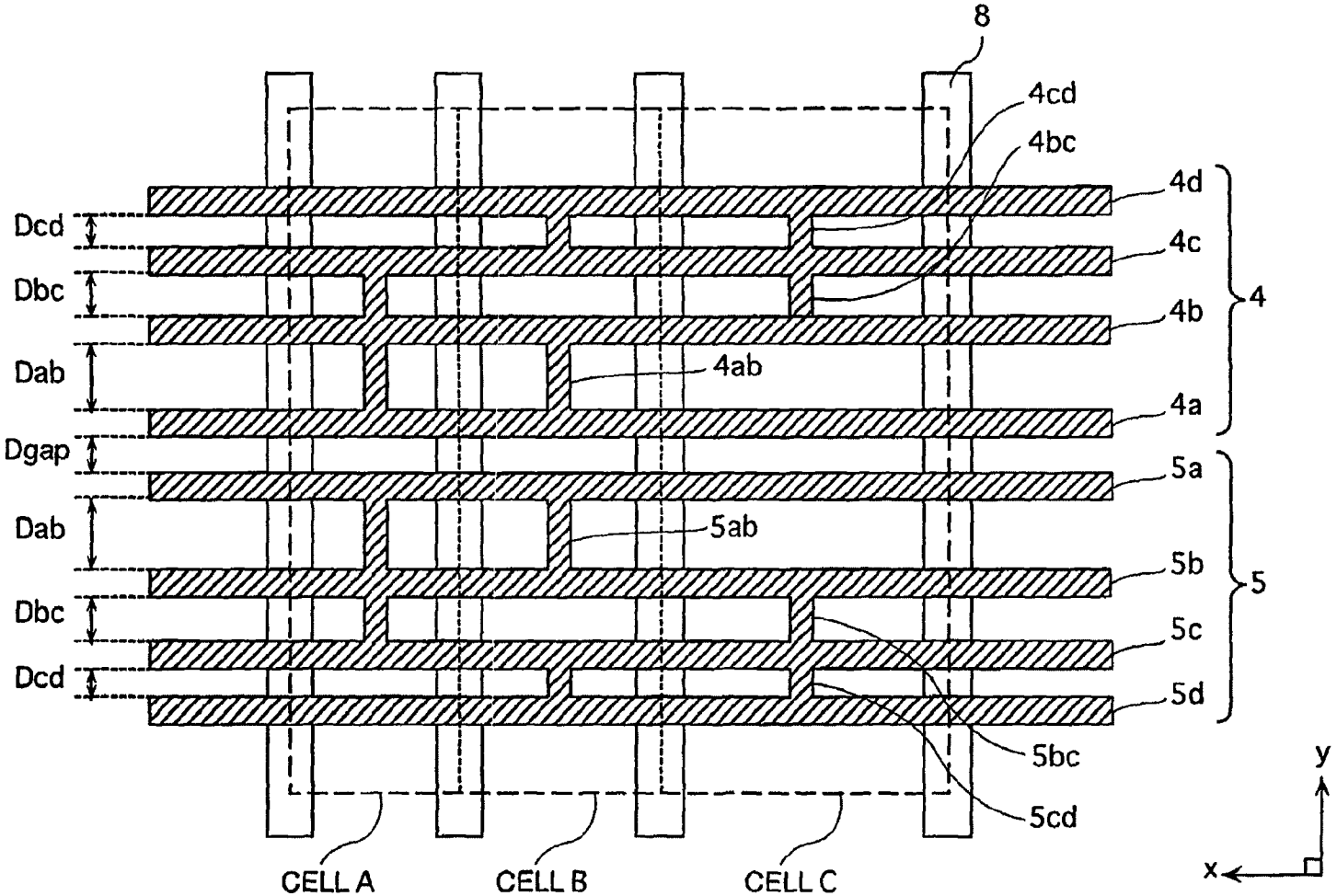
FIG. 15 is a plan view of display electrodes that are a modification to the second embodiment.

Basically, it is desirable to position the connector part far from the main discharge gap Dgap in the cell which is relatively wide in the x direction, as explained earlier. As for the remaining cells, the positions of the connector parts can be adjusted to some extent, as shown in FIG. 15 (modification 2-3). In the drawing, the display electrodes 4 and 5 each have four line parts, and two connector parts are provided for each of the display electrodes 4 and 5 in each cell. Here, the cell which has a high discharge firing voltage, such as cell A, has such a display electrode structure that reduces the drive voltage. On the other hand, the cell which has a low discharge firing voltage, such as cell C, has such a display electrode structure that requires a high drive voltage.

When Dab>Dbc>Dcd as shown in FIG. 15, connector parts are positioned between line parts 4a and 4b (5a and 5b) and between line parts 4a and 4c (5a and 5c) in cell A, whilst connector parts are located between line parts 4b and 4c (5a and 5c) and between line parts 4c and 4d (5c and 5d) in cell C.

In other words, when a cell has a higher discharge firing voltage, the total length of connector parts provided in the cell is greater.

By so doing, variations in drive voltage between cells can be suppressed.

This modification also applies to a case where each display electrode has more than four line parts.

2-2. Specific Effects of the Second Embodiment

Effects of providing the connector parts 4ab and 4bc (5ab and 5bc) in each cell in the second embodiment are explained below.

Figure 16A:
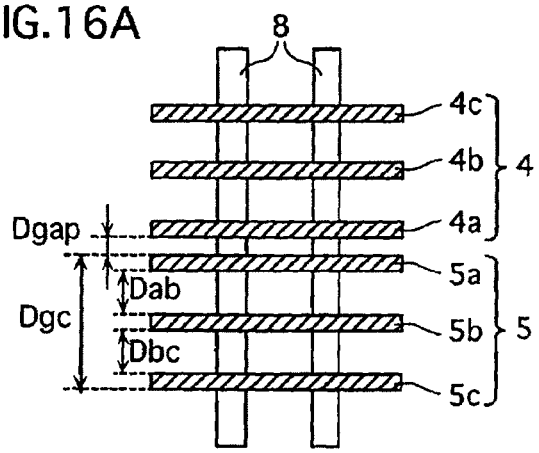
FIG. 16 shows discharge current waveforms when connector parts and line parts are combined in different patterns.
Figure 16B:
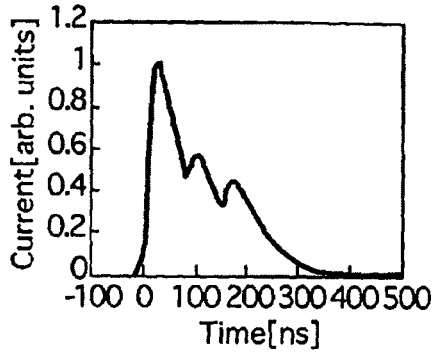

FIGS. 16A and 16B relate to a comparative example. FIG. 16A shows a display electrode structure which is made up of only line parts, while FIG. 16B shows a discharge current waveform for this display electrode structure.

Figure 16C:
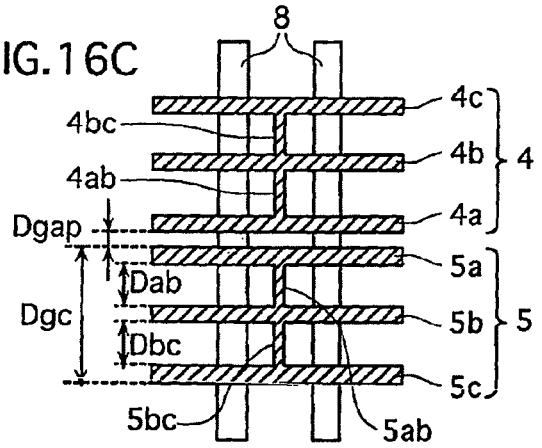
Figure 16D:
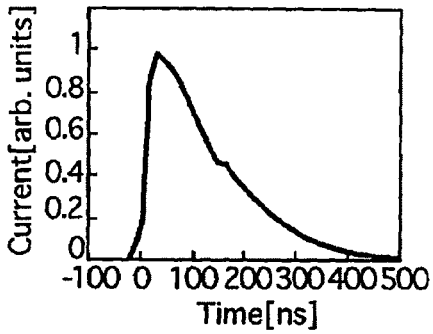

FIG. 16C shows a display electrode structure which includes the connector parts 4ab and 4bc (5ab and 5bc) of the second embodiment, while FIG. 16D shows a discharge current waveform for this display electrode structure.

Figure 16E:
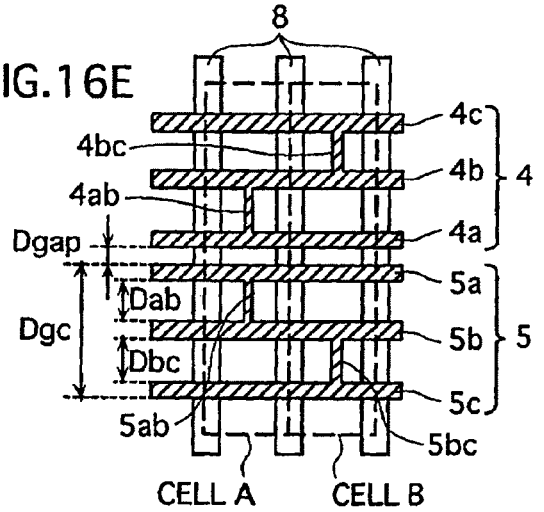
Figure 16F:
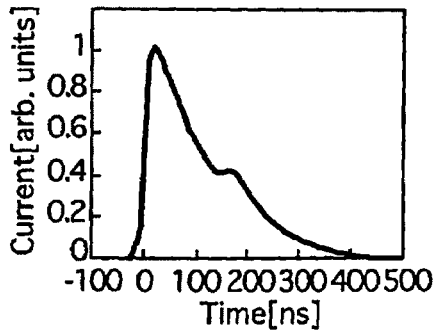

FIG. 16E shows a display electrode structure which includes the connector parts 4ab and 4bc (5ab and 5bc) of the modification 2-1, while FIG. 16F shows a discharge current waveform for this display electrode structure.

In all cases, the discharge starts in the main discharge gap Dgap that is the smallest gap between the pair of display electrodes. This discharge expands with time, and eventually spreads throughout the cell including the line part 4c (5c).

In the case of FIG. 16A, the line parts 4a-4c (5a-5c) to which a discharge current is supplied are simply positioned in a discrete manner. Accordingly, the discharge grows in a discrete fashion too, as a result of which a plurality of peaks appear in discharge current waveform as shown in FIG. 16B. Since the electrode structure is discrete, the electric field strength of the discharge space is discrete. Therefore, a relatively high drive voltage is needed for the discharge which is generated in the main discharge gap Dgap to spread to the line part 4b (5b) and to the line part 4c (5c).

In the case of FIG. 16C, on the other hand, the discharge current waveform has a single peak as shown in FIG. 16D. Since the connector parts 4ab and 4bc (5ab and 5bc) are provided to connect the line parts 4a-4c (5a-5c), the discharge grows continuously. This is because the electric field strength of the discharge space has been made continuously high by providing the connector parts 4ab and 4bc (5ab and 5b). As a result, the drive voltage can be reduced (the inventors found through experimentation that an illumination voltage of about 200V was reduced by about 5V).

In the case of FIG. 16E, the display electrode structure is more discrete than that of FIG. 16C. As a result, the peak of the discharge current deforms a little as shown in FIG. 16F, which causes the drive voltage to increase. Nevertheless, the discharge current waveform of FIG. 16F can be regarded as having a single peak, when compared with that of FIG. 16B. Also, the illumination voltage is reduced by about 3V. Further, the length of connector parts provided in each cell in FIG. 16E is shorter than that in FIG. 16C, which increases the opening ratio and thereby improves the panel luminance.

(Third Embodiment)

3-1. Structure of a Display Electrode

In the first and second embodiments, a display electrode is made up of at least two line parts and at least one connector part which electrically connects the line parts, when the red cell, the green cell, and the blue cell have different widths in the x direction.

Figure 17:
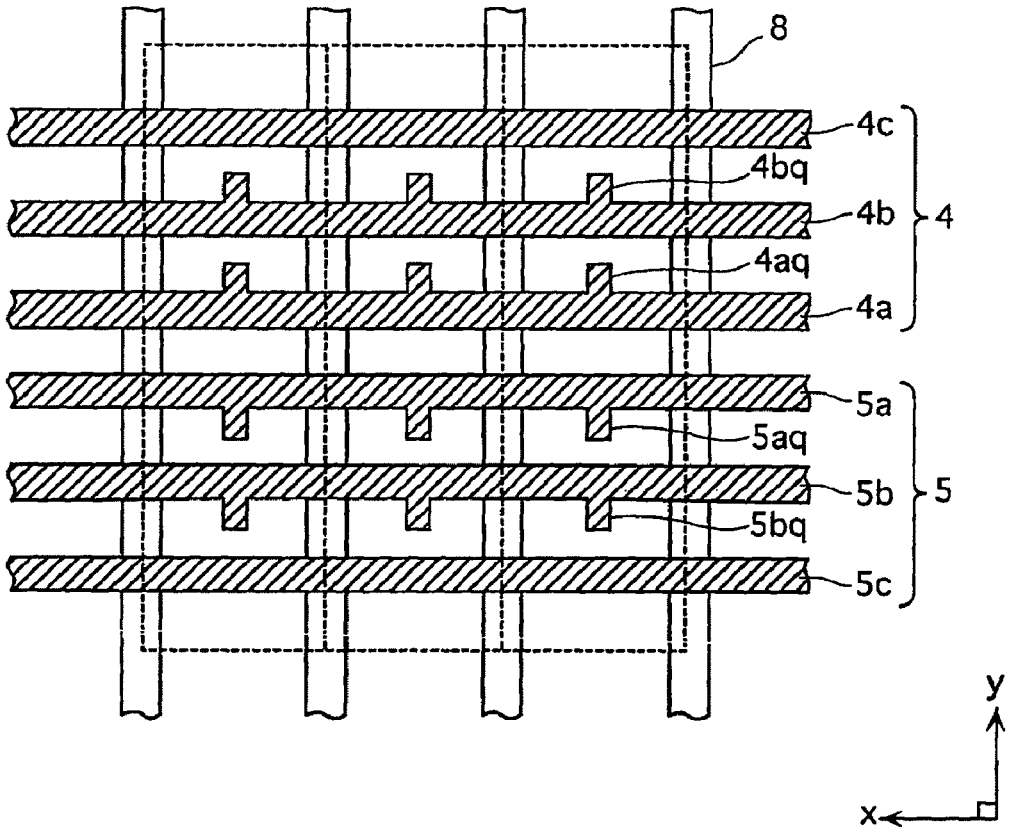
FIG. 17 is a plan view of display electrodes that are the third embodiment of the present invention.

In the third embodiment, the display electrode 4 (5) includes three line parts 4a-4c (5a-5c) and projection parts 4aq and 4bq (5aq and 5bq) which are each provided on one side of any of the line parts 4a and 4b (5a and 5b) as a discharge developing part, as shown in FIG. 17. Here, the projection parts 4aq and 4bq (5aq and 5bq) have a rectangular shape, and are formed so as to extend in the y direction.

These projection parts 4aq and 4ba (5aq and 5bq) are formed such that the gap between adjacent line parts (e.g. 4a and 4b (5a and 5b)) is smaller in the areas corresponding to the channels between adjacent barrier ribs 8 than in the areas corresponding to the barrier ribs 8.

As one example, the size of each part is as follows. The line part width in the y direction is about 10-100 μm, and preferably about 25-60 μm. The distance between adjacent line parts excluding the projection parts 4aq and 4bq (5aq and 5bq) is about 100-200 μm, and preferably 50-100 μm. The projection part width in the x direction is no greater than 50% of the cell width in the x direction, and preferably no greater than 20% of the cell width in the x direction. Also, the projection part length in the y direction is such that the distance between the projection part and its facing line part is preferably no greater than the main discharge gap Dgap, and more preferably no greater than half the main discharge gap Dgap (e.g. 40 μm or less when the main discharge gap Dgap is 80 μm).

3-2. Specific Effects of the Third Embodiment

The following is known through experimentation. Suppose the display electrode 4 (5) has a plurality of line parts. This being so, when the distance between adjacent line parts is greater, the luminance and the illumination efficiency increase. On the other hand, if the distance between adjacent line parts is widened, a sudden increase in discharge firing voltage Vf may occur, as in the case of widening the main discharge gap Dgap. This poses a significant obstacle to implementation of panels.

This can be explained as follows. When the distance between adjacent line parts is widened, the discharge at the discharge firing voltage Vf starts only in the line part that is closest to the main discharge gap Dgap. To spread this discharge throughout the cell, a higher voltage is needed.

In view of this problem, the third embodiment provides the aforementioned projection parts 4aq and 4bq (5aq and 5bq) on the sides of the line parts 4a and 4b (5a and 5b), in order to locally reduce the distance between adjacent line parts. This helps the discharge which is generated near the main discharge gap Dgap spread throughout the cell even with a low voltage. In so doing, the rate of luminance change caused by a change in discharge voltage can be suppressed, and the discharge firing voltage Vf can be decreased.

This discharge voltage reduction effect produced by the provision of the projection parts 4aq and 4bq (5aq and 5bq) greatly depends on the main discharge gap Dgap and the distance between adjacent line parts. If the distance between each projection part and its facing line part is no greater than the main discharge gap Dgap, the effect becomes particularly high. This effect is further enhanced if the distance between the projection part and the facing line part is no greater than 50% of the main discharge gap Dgap.

When the display electrode is only made up of line parts, the discharge current suddenly changes during the growth of discharge from he main discharge gap Dgap. This causes a drop in the potential of the electrode. Here, if line parts of the same polarity are connected by a connector part, all connected line parts tend to suffer some voltage drop during the discharge. According to the third embodiment, however, the projection parts 4aq and 4bq (5aq and 5bq) are provided to the line parts, so that the line parts of the same polarity are not directly connected. As a result, a voltage drop hardly affects the outer line parts. In other words, the spread of the voltage drop is stopped at the line part 4a (5a) that is closest to the main discharge gap Dgap. Accordingly, the discharge spreads to the outermost line part more easily than in the first and second embodiments, with it being possible to deliver a further reduction in voltage.

The third embodiment also has an effect of improving the cell opening ratio, by providing the projection parts instead of the connector parts.

Thus, the display electrode structure of the third embodiment enables the distance between adjacent line parts to be widened while maintaining the same discharge voltage, when compared with a display electrode structure which is only made up of line parts. Hence PDPs having high luminance and high illumination efficiency can be realized.

3-3. Modifications to the Third Embodiment

Figure 18:
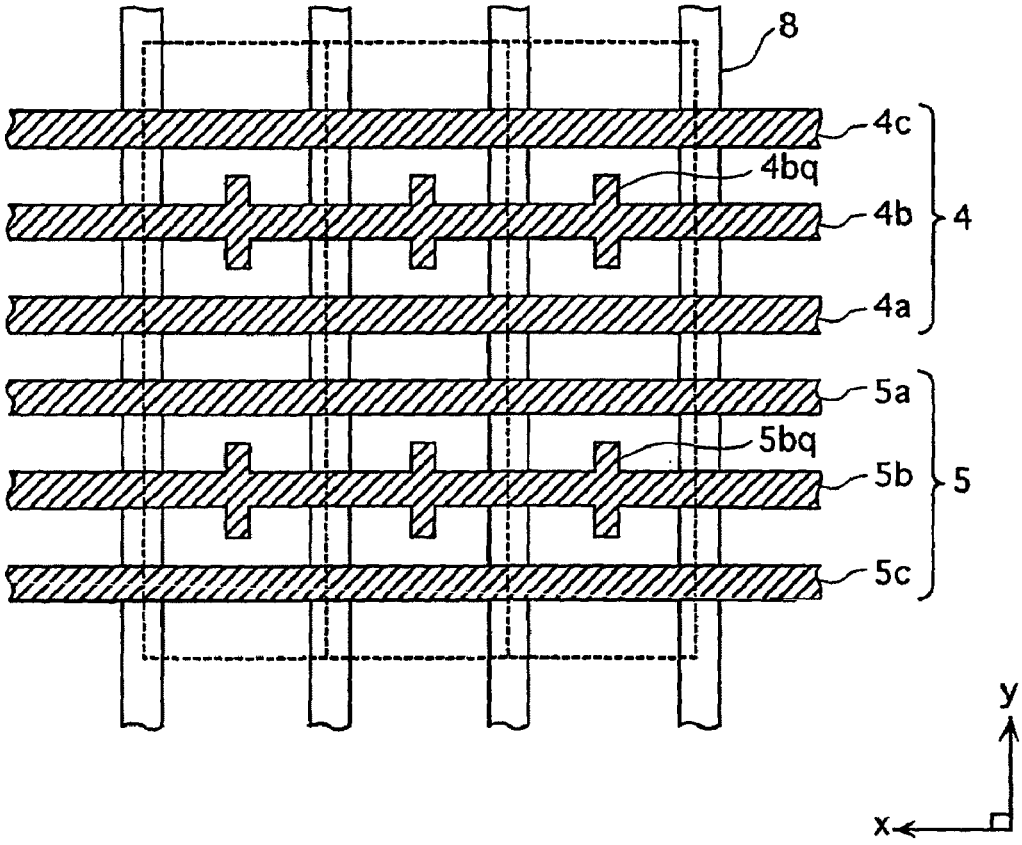
FIG. 18 is a plan view of display electrodes that are a modification to the third embodiment.

The third embodiment describes the case where the projection parts 4aq and 4bq (5aq and 5bq) are each provided on only one side of one of the line parts 4a and 4b (5a and 5b), but this is not a limit for the present invention. For example, the projection parts 4bq (5bq) may be provided on both sides of the line parts 4b (5b) towards the adjacent line parts 4a and 4c (5a and 5c), as shown in FIG. 18 (modification 3-1). In this case, the line part width is about 10-100 μm, and preferably about 25-60 μm. The distance between adjacent line parts is about 10-200 μm, and preferably 50-100 μm. The projection part length in the x direction is no greater than 50% of the cell width, and preferably no greater than 20% of the cell width. Also, the distance between each projection part and its facing line part is preferably no greater than the main discharge gap Dgap, and more preferably no greater than half the main discharge gap Dgap.

When a display electrode includes line parts, a larger distance between adjacent line parts contributes to higher luminance and higher illumination efficiency. However, if the distance between adjacent line parts is widened, a sudden increase in discharge firing voltage Vf may occur, as in the case of widening the main discharge gap Dgap. This poses a significant obstacle to implementation of panels.

This can be explained as follows. When the distance between adjacent line parts is widened, the discharge at the discharge firing voltage Vf starts only in the line part that is closest to the main discharge gap Dgap. To spread this discharge throughout the cell, a higher voltage is necessary.

In view of this problem, the modification 3-1 provides the aforementioned projection parts in the gaps between adjacent line parts, in order to locally shorten the distance between adjacent line parts. Also, by forming such projection parts that cross over the line parts, the discharge which occurs in the main discharge gap Dgap spreads to the outer line parts more easily when compared with the case where the projection parts are provided only on one side of the line parts. Hence the rate of luminance change caused by discharge voltage can be suppressed, and the discharge firing voltage Vf can be decreased.

Thus, according to the display electrode structure of the modification 3-1, high luminance and high illumination efficiency can be achieved with a lower voltage, when compared with the conventional display electrode structure which is only made up of line parts.

Figure 19:
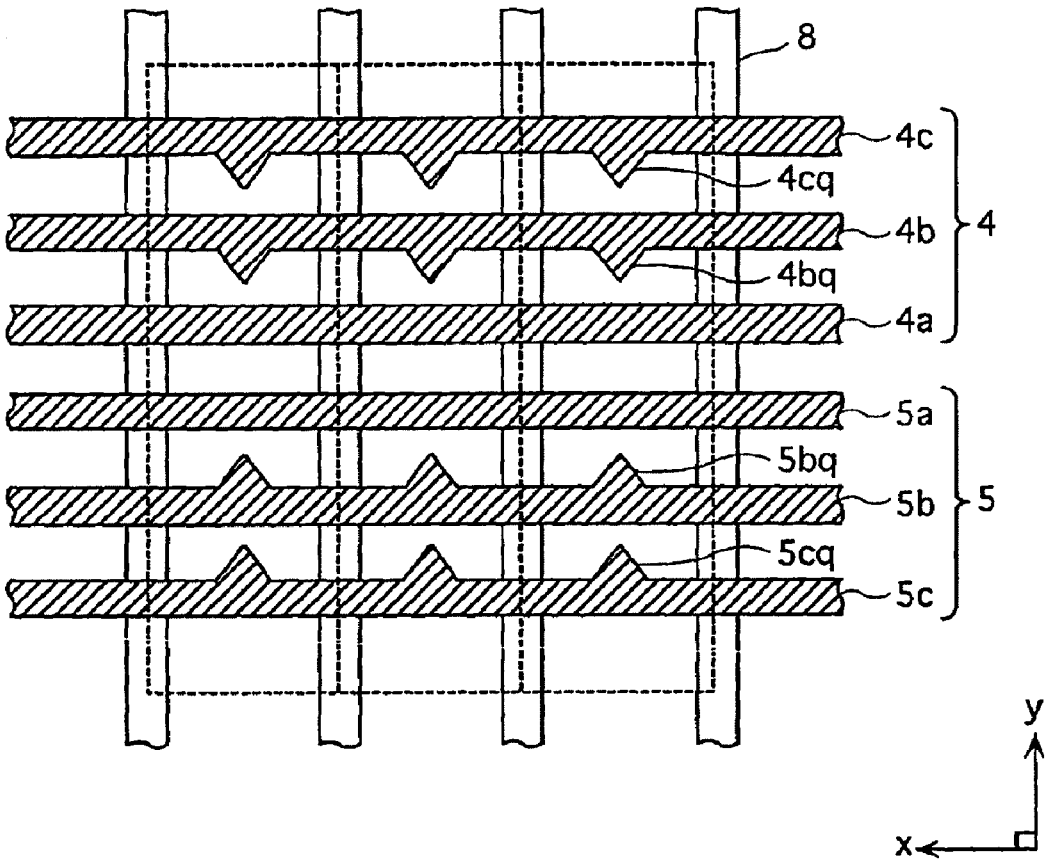
FIG. 19 is a plan view of display electrodes that are a modification to the third embodiment.

Here, the shape of the projection parts is not limited to a rectangle. Other shapes such as a triangle, a quadrilateral, a cannon-ball, and a letter T are applicable, too. FIG. 19 shows a display electrode structure having triangular projection parts 4bq and 4cq (5bq and 5cq) (modification 3-2). According to this modification, discharge expands between the top of the triangle of each projection part and its facing line part.

Figure 20:
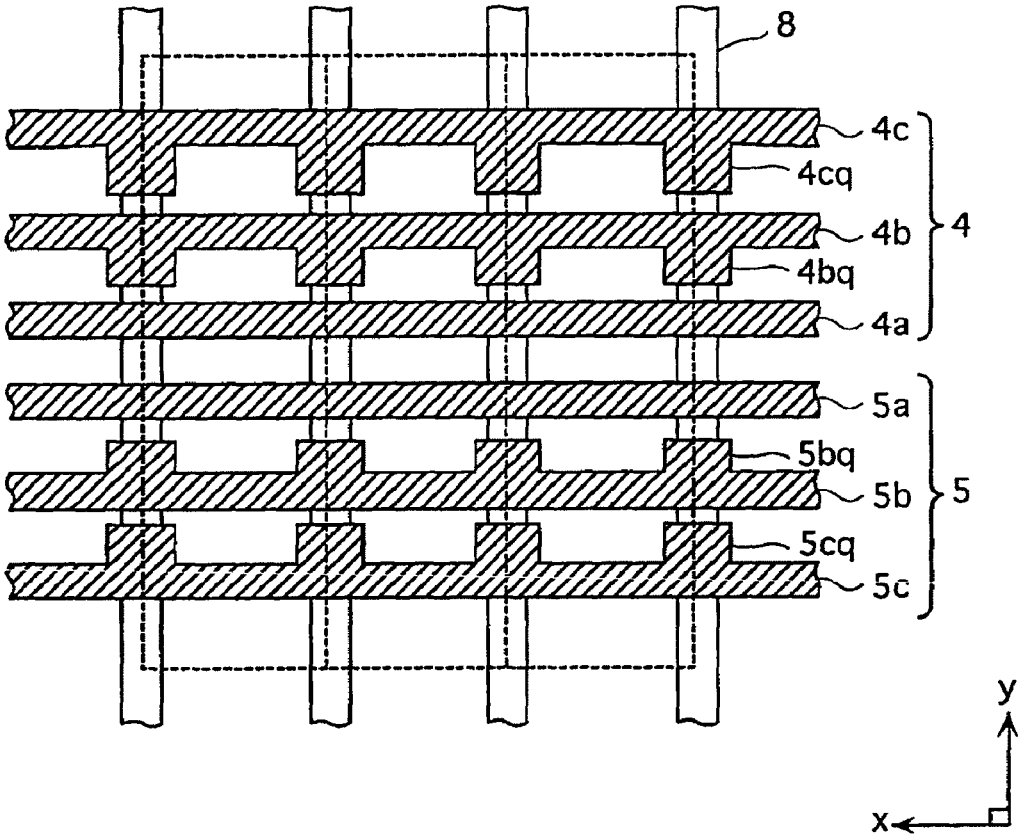
FIG. 20 is a plan view of display electrodes that are a modification to the third embodiment.

Basically, it is desirable to provide the projection parts at the center of the gaps between the adjacent barrier ribs 8. However, this is not a limit for the present invention. For example, the projection parts 4bq and 4cq may be provided so as to overlap the barrier ribs 8 when looked from the above, as shown in FIG. 20 (modification 3-3). Here, the projection part width is a little larger than the barrier rib width.

In doing so, the discharge voltage can be decreased, and the opening ratio can be increased. This allows the discharge to occur near the phosphor on the barrier ribs and then spread in the x direction. Hence high luminance can be produced.

Figure 21:
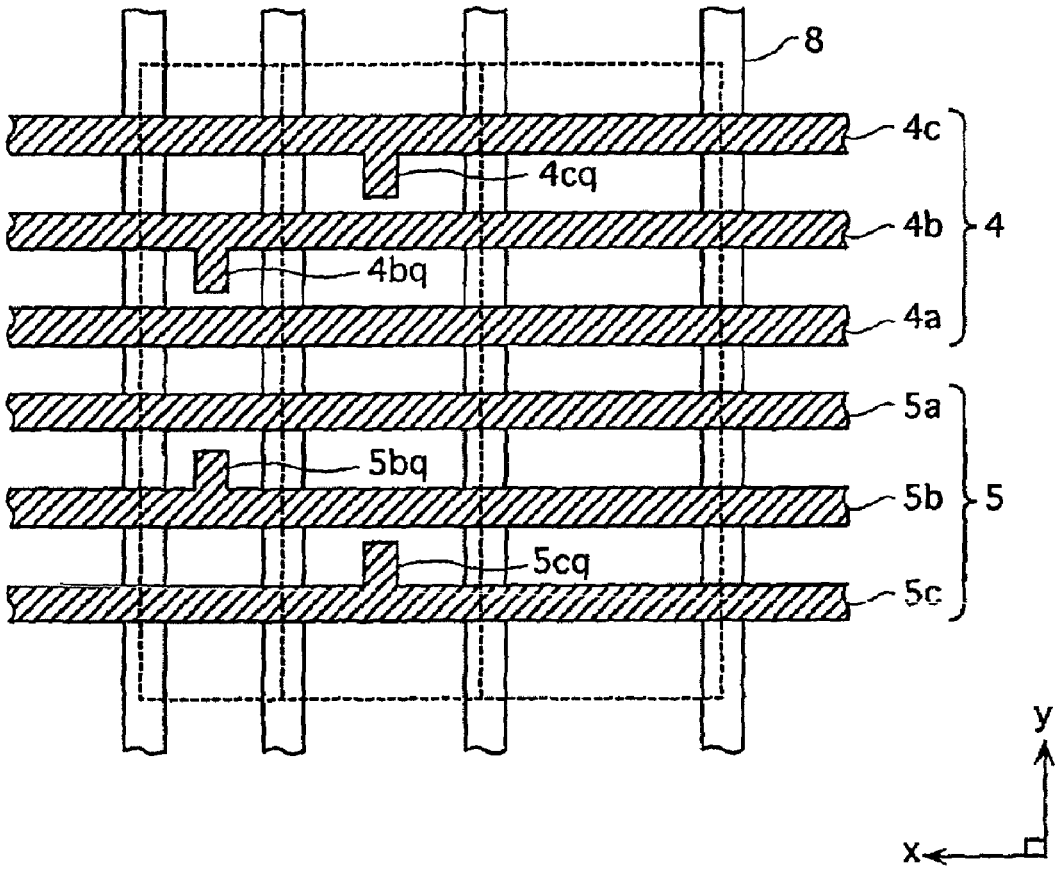
FIG. 21 is a plan view of display electrodes that are a modification to the third embodiment.

Suppose the third embodiment is applied to a case where the red cell, the green cell, and the blue cell have different widths in the x direction. In such a case, a structure shown in FIG. 21 may be employed (modification 3-4). In the cell which has the smallest cell width, the projection part 4bq (5bq) is provided on the line part 4b (5b) near the main discharge gap Dgap. In the cell which has moderate luminance, the projection part 4cq (5cq) is provided on the line part 4c (5c) far from the main discharge gap Dgap. In the cell which has the largest cell width, no projection part is provided.

As an alternative, the positions of the projection parts may be determined so as to ensure uniform discharge characteristics such as discharge voltage between the cells.

Figure 22:
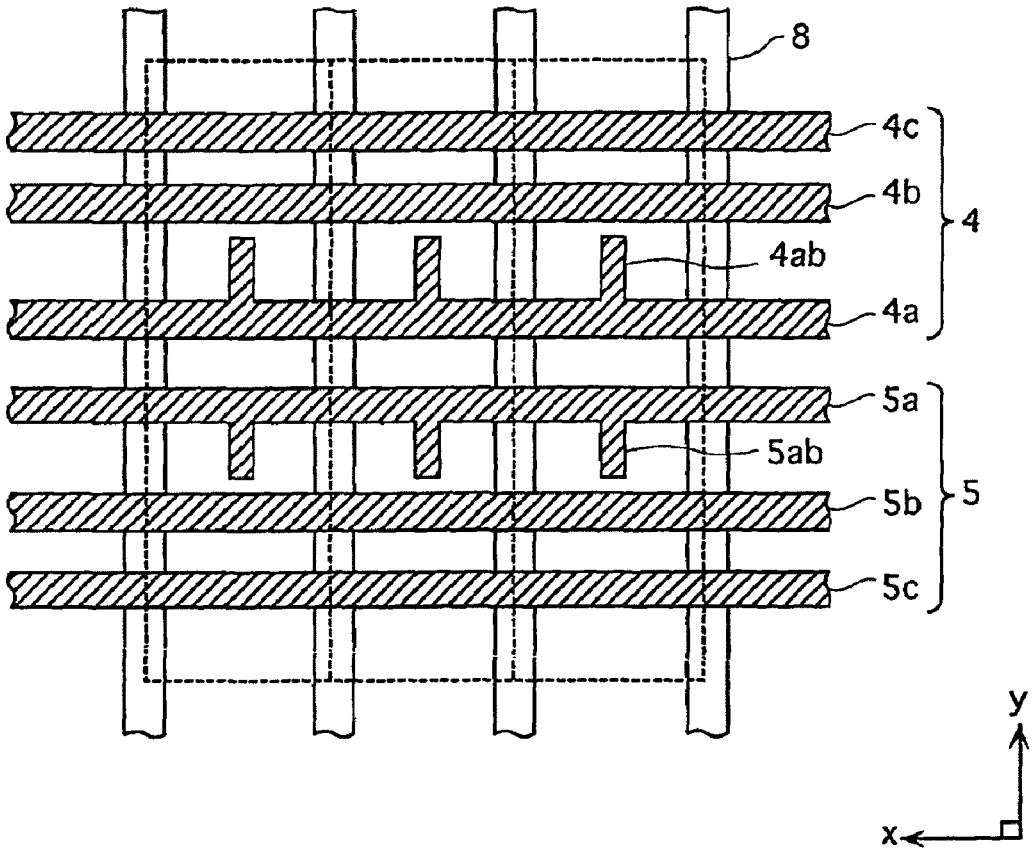
FIG. 22 is a plan view of display electrodes that are a modification to the third embodiment.

Also, the third embodiment can be combined with the structure of the second embodiment which realizes ramp discharge (modification 3-5). In FIG. 22, the distance between adjacent line parts is smaller when the line parts are farther from the main discharge gap Dgap. This being so, projection parts 4ab (5ab) are provided to the line part 4a (5a). This structure exhibits the effect of the third embodiment. In addition, the discharge generated at the main discharge gap Dgap at the start of the discharge is effectively used for visible light, which enables ramp discharge to be carried out efficiently.

Figure 23:
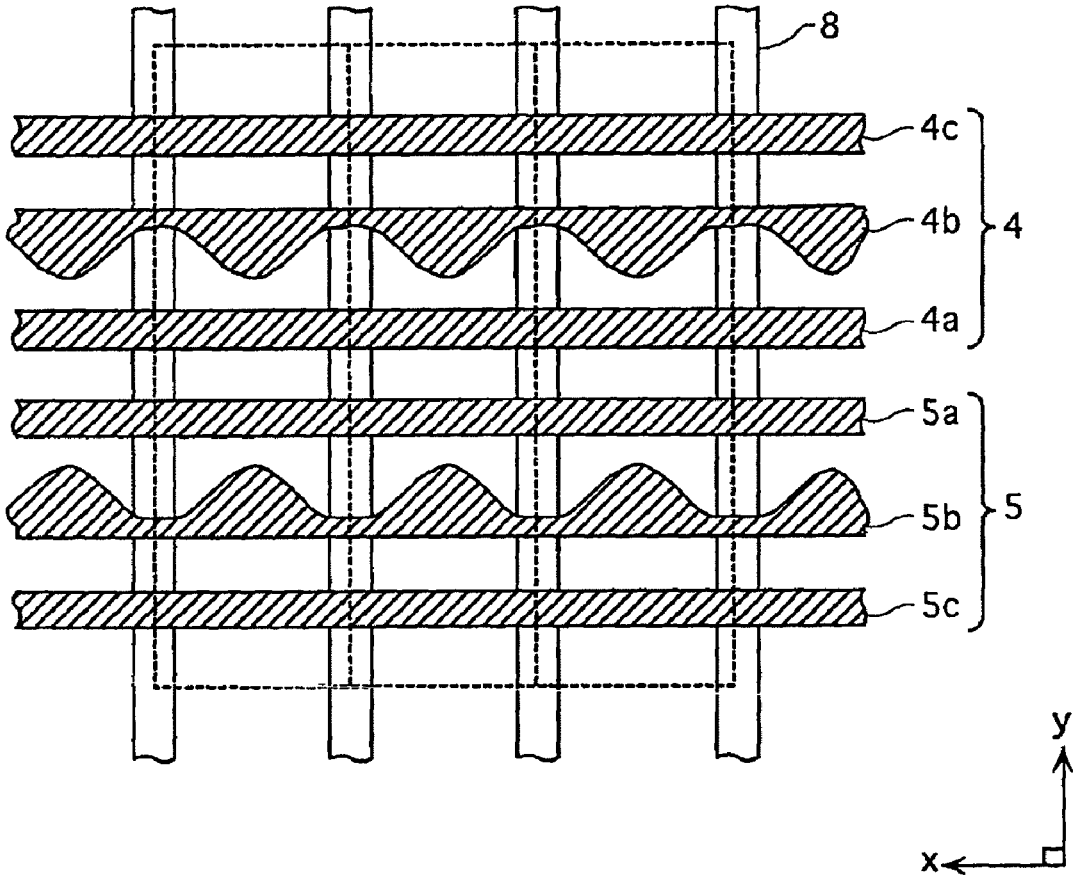
FIG. 23 is a plan view of display electrodes that are a modification to the third embodiment.

Also, the projection parts may have a large wavelike shape as shown in FIG. 23 (modification 3-6). This structure has the same effects as the modification 3-2.

Figure 24:
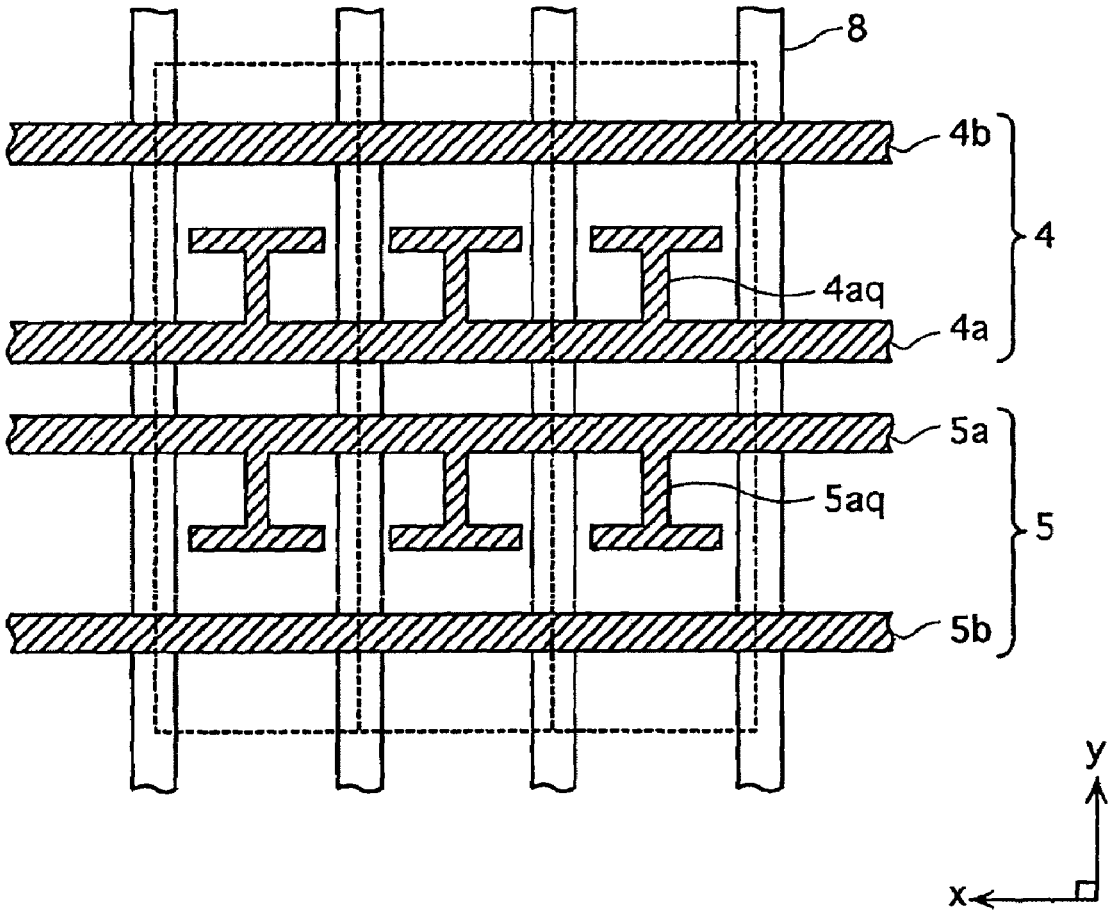
FIG. 24 is a plan view of display electrodes that are a modification to the third embodiment.

Also, T-shaped projection parts 4aq (5aq) may be provided as shown in FIG. 24 (modification 3-7). By doing so, the effective electrode area of the line part 4a (5a) near the main discharge gap Dgap can be widened. Thus, the spatial extent of the discharge in the main discharge gap Dgap caused by the discharge firing voltage Vf is increased. This suppresses a sudden luminance change around the discharge firing voltage Vf and decreases the discharge firing voltage Vf itself. Furthermore, the T shape of the projection parts 4aq (5aq) helps the discharge spread in the x direction. As a result, the discharge spreads evenly throughout the cell, which benefits high luminance and illumination efficiency.

Luminance caused by discharge in a surface discharge PDP is centered around the main discharge gap. Accordingly, it is important to increase the opening ratio near the main discharge gap, to improve luminance and illumination efficiency. In a conventional surface discharge PDP, a transparent electrode material is used for a display electrode near the main discharge gap, so that the opening ratio near the main discharge gap need not be increased. However, when using a line part that is made from a metal thin film or the like, the opening ratio near the main discharge gap significantly affects the luminance and the illumination efficiency.

Figure 25:
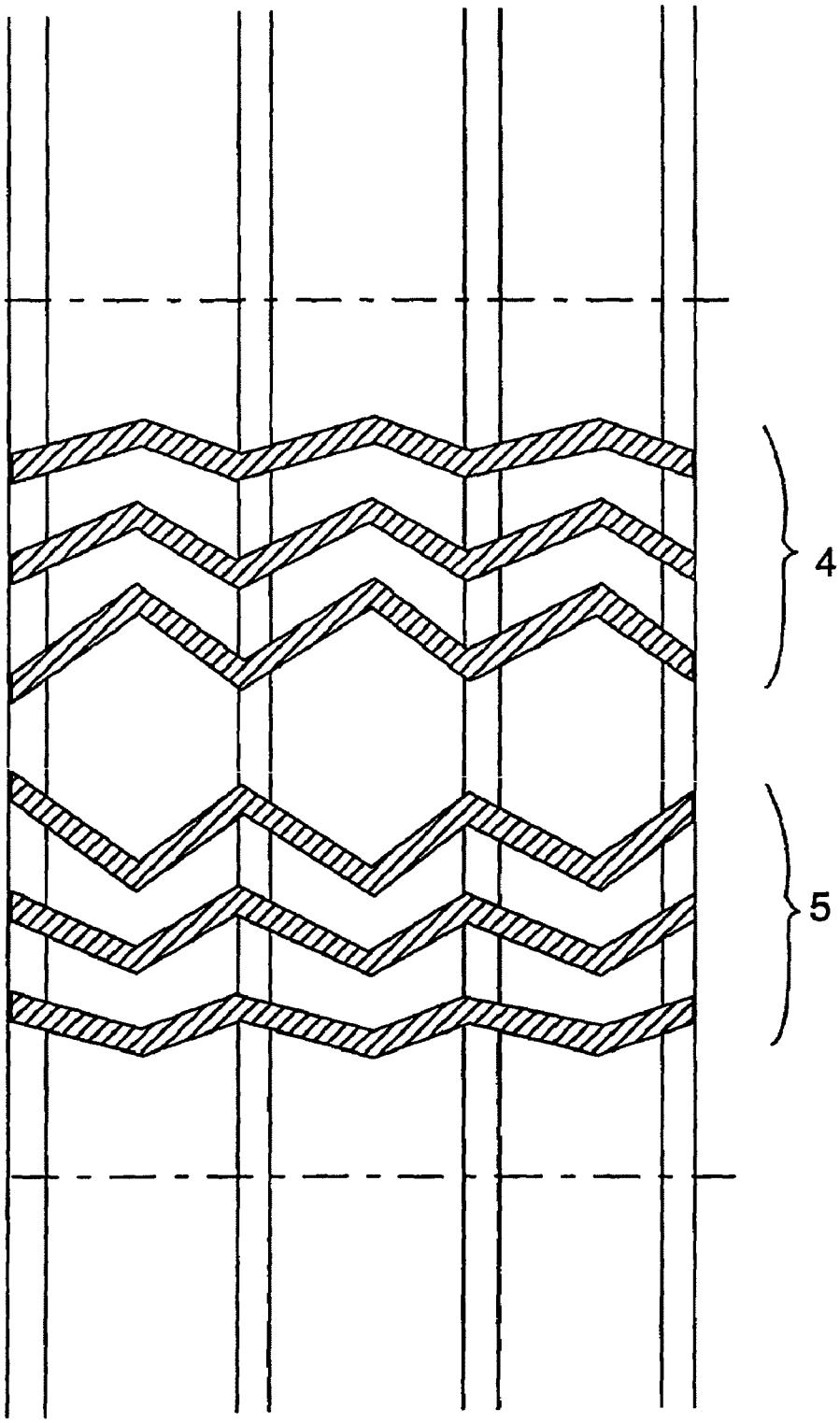
FIG. 25 is a plan view of display electrodes that are a modification to the third embodiment.
Figure 26:
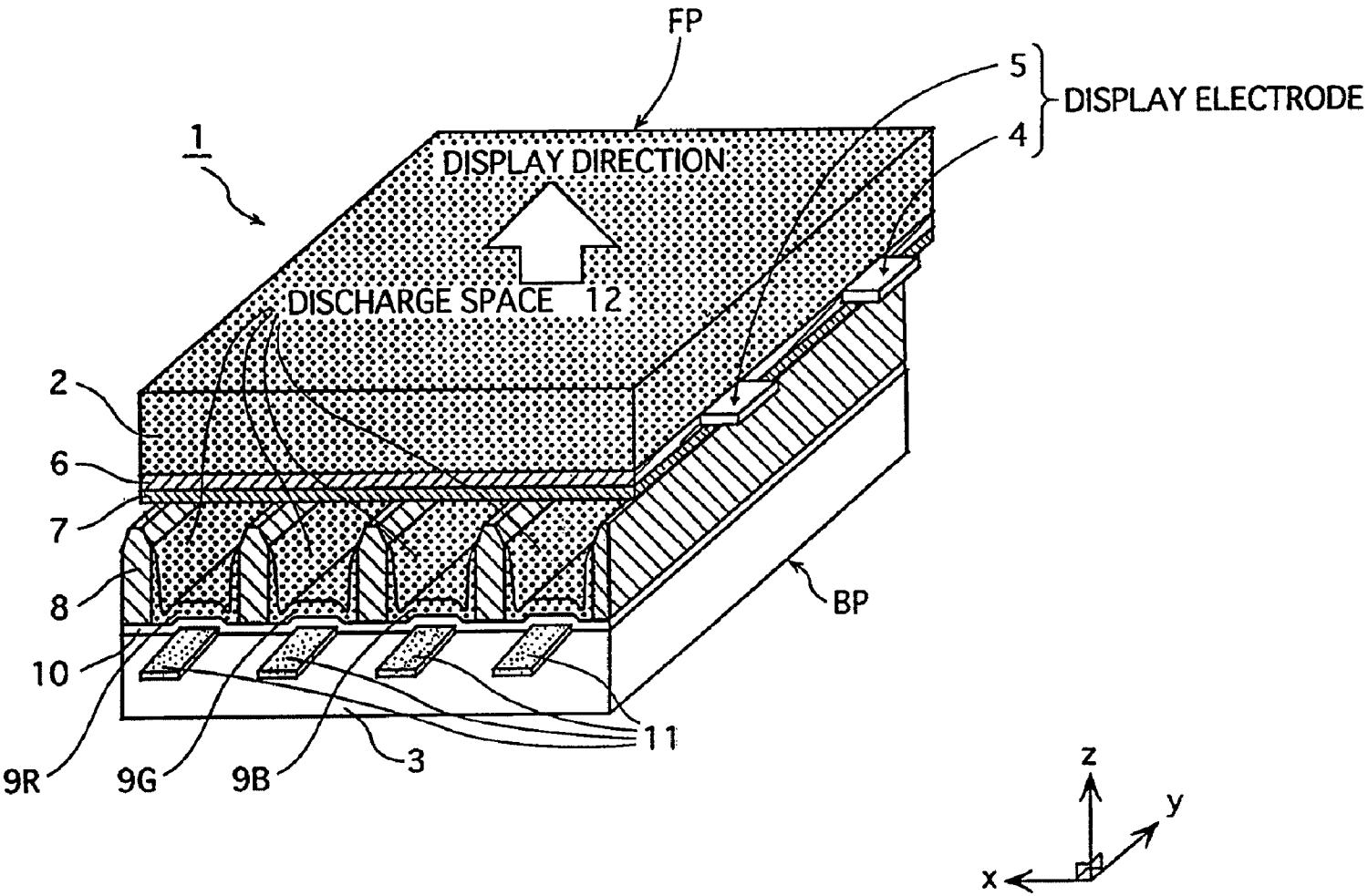
FIG.26 PRIOR ART
FIG. 26 is a partial sectional perspective view showing a main construction of a typical surface discharge AC PDP.
Figure 27:
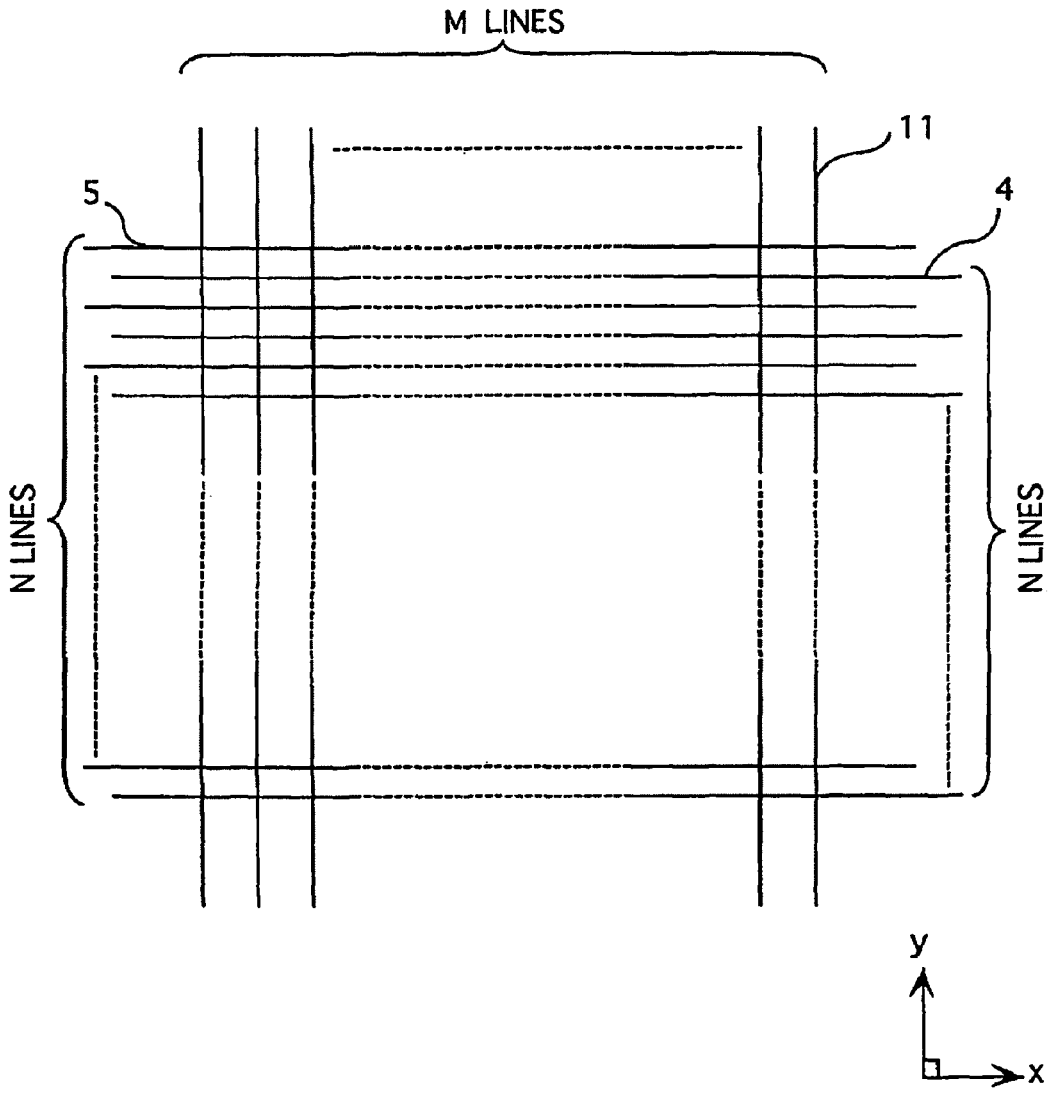
FIG.27 PRIOR ART
FIG. 27 is a graph showing a matrix which is formed by a plurality of pairs of display electrodes (N lines) and a plurality of address electrodes (M lines) in the PDP.
Figure 28:
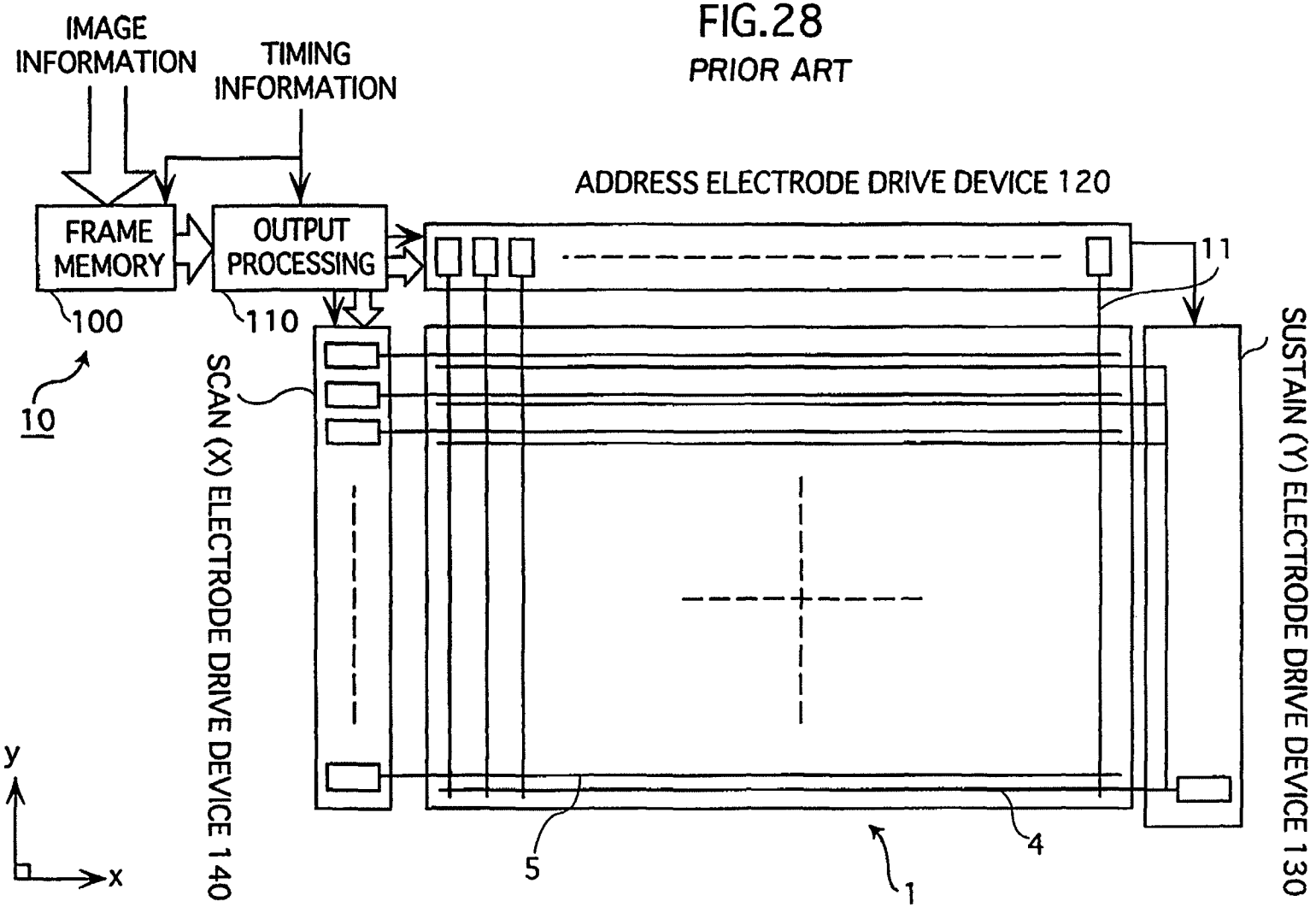
FIG.28 PRIOR ART
FIG. 28 is a block conceptual diagram of an image display device that uses a conventional PDP.
Figure 29:
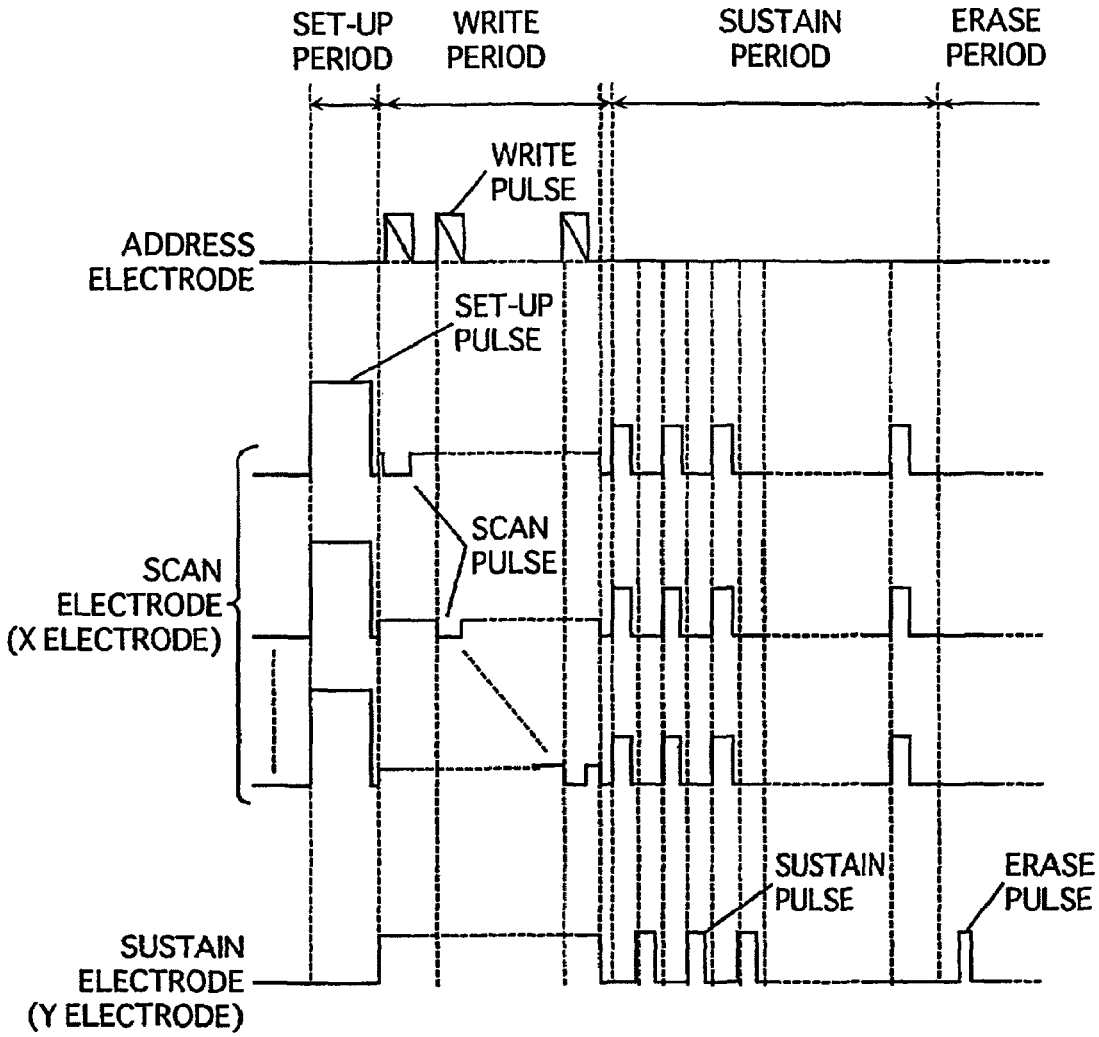
FIG.29 PRIOR ART
FIG. 29 shows an example of drive waveforms which are applied to the electrodes (scan electrodes, sustain electrodes, and address electrodes) in the PDP.
Figure 30:
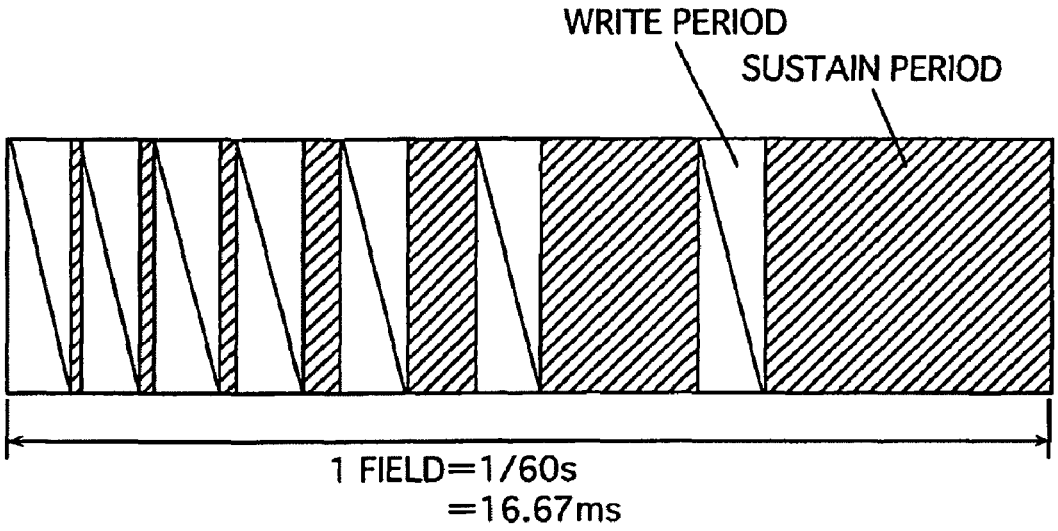
FIG.30 PRIOR ART
FIG. 30 shows a method of dividing into sub-fields, when the conventional AC PDP expresses a 256-level gray scale for each color.

FIG. 25 shows another modification to the third embodiment. In the drawing, each display electrode is formed by arranging a plurality of line parts which are each shaped like a zigzag. Here, the turns of the zigzag are gentler when the line part is farther from the main discharge gap. In this case too, the distance between adjacent line parts is smaller in the areas corresponding to the channels between the adjacent barrier ribs than in the areas corresponding to the barrier ribs. Accordingly, these line parts serve as discharge developing parts. This structure produces the same effects as the structure shown in FIG. 19.

A metal thin film Cr/Cu/Cr is used as an electrode material in this embodiment, though the invention should not be limited to this. The same effects can be achieved by using a thick film electrode that is formed by patterning, through printing or similar, a metal thin film of Pt, Au, Ag, NiCr, or the like or a paste in which a metal powder of Ag, Ag/Pd, Cu, Ni, or the like is dispersed in an organic vehicle, and then baking the result.

Also, the same effects can be delivered by using a transparent electrode material for the projection parts. This further increases the opening ratio, which contributes to higher luminance and higher illumination efficiency.

Also, a transparent electrode may be used for an electrode which has connector parts as in the first and second embodiments or for an electrode which has projection parts as in the third embodiment. A transparent electrode typically has a large line resistance, and so discharge develops slowly in the cell. Accordingly, the discharge developing effects of the connector parts or projection parts become more prominent.

Also, the projection parts may not be integrated with the scan electrode or sustain electrode. Instead, they may be electrically connected with the scan electrode or sustain electrode.

Also, an electrode structure that combines the connector parts and the projection parts is applicable.

INDUSTRIAL APPLICABILITY

The present invention can be used for a television, and in particular for a high-definition television that produces a high-resolution image.

What is claim is:

1. A gas discharge panel in which phosphor layers corresponding to three colors of red, green, and blue are formed one by one in a plurality of cells, with a plurality of display electric pairs made [up] of a sustain electrode and a scan electrode arranged so as to cross the plurality of cells, [the improvement] *said panel* comprising:

the sustain electrodes having a plurality of separated line parts in each cell;

the scan electrodes having a plurality of separated line parts in each cell; and a connector part connecting at least two line parts of the plurality of line parts of the sustain electrode and scan electrode in each cell;

wherein the plurality of line parts, with adequate connector part in each cell are relatively spaced to form a main discharge gap that only requires a single peak discharge current waveform for driving the sustain electrode and scan electrode.

2. The gas discharge panel of claim 1, wherein a width of each of the plurality of cells, measured in the same direction that each of the plurality of line parts extend, is determined according to luminance of a phosphor layer formed in the cell.

3. The gas discharge panel of claim 1, wherein the sustain electrode and the scan electrode each have at least three line parts, and a distance between two adjacent line parts decreases as a distance from the main discharge gap increases.

4. The gas discharge panel of claim 1, wherein in each cell which requires a lowest discharge firing voltage among the plurality of cells, the connector part is positioned between two adjacent line parts that are closest to each other.

5. The gas discharge panel of claim 1, wherein in each cell which requires a highest discharge firing voltage among the plurality of cells, the connector part is positioned between two adjacent line parts that are farthest from each other.

6. The gas discharge panel of claim 1, wherein the sustain electrode and the scan electrode are each formed using a metal material.

7. The gas discharge panel of claim 6, wherein the metal material includes Ag.

8. The gas discharge panel of claim 1, wherein the sustain electrode and the scan electrode occupy less than 40% of a cell area of each of the plurality of cells.

9. The gas discharge panel of claim 1, wherein the sustain electrode and the scan electrode each have at least three line parts, and a distance between the connector part and the main discharge gap increases in an order of red, green, and blue.

10. The gas discharge panel of claim 1, wherein the sustain electrode and the scan electrode each have at least three line parts, and in each cell which requires a lower drive voltage among the plurality of cells, the connector part is positioned farther from the main discharge gap.

11. The gas discharge panel of claim 1, wherein projections are formed on facing sides of two adjacent line parts that are closest to the main discharge gap among the plurality of line parts.

12. A gas discharge display device comprising:

the gas discharge panel of claim 1 wherein a first substrate on which the plurality of sustain electrodes and the plurality of scan electrodes are formed is set facing a second substrate on which a plurality of address electrodes are formed; and a drive circuit which drives the plurality of sustain electrodes, the plurality of scan electrodes, and the plurality of address electrodes.

13. The gas discharge display device of claim 12, wherein the drive circuit applies a voltage whose waveform has a gentle slope, in a set-up period.

14. A gas discharge panel in which a plurality of display electrode pairs made up of a sustain electrode and a scan electrode are arranged to cross a plurality of cells, the improvement comprising:

the sustain electrode having a plurality of separated line parts in each cell;

the scan electrode having a plurality of separated line parts in each cell; and a discharge accelerating part located between line parts of the sustain electrodes and/or the scan electrodes in a plurality of cells[;], wherein the plurality of line parts, with the discharge accelerating part are spaced relatively to form a main discharge gap in each cell so that only a single peak discharge current waveform is needed for driving the sustain electrode and scan electrode in each cell.

15. The gas discharge panel of claim 14, wherein size of each of the plurality of cells is determined according to luminance of a phosphor layer formed in the cell.

16. The gas discharge panel of claim 14, wherein the discharge accelerating part is shaped like any one of a triangle, a quadrilateral, a cannon-ball, and a letter T.

17. The gas discharge panel of claim 14, a distance between adjacent line parts decreases as a distance from the main discharge gap increases.

18. The gas discharge panel of claim 14, wherein the sustain electrode and the scan electrode are each formed using a metal material.

19. The gas discharge panel of claim 18, wherein the metal material includes Ag.

20. A gas discharge display device comprising:

the gas discharge panel of claim 14*;* wherein a first substrate on which the plurality of sustain electrodes and the plurality of scan electrodes are formed is set facing a second substrate on which a plurality of address electrodes are formed; and a drive circuit which drives the plurality of sustain electrodes, the plurality of scan electrodes, and the plurality of address electrodes.

21. The gas discharge display device of claim 20, wherein the drive circuit applies a voltage whose waveform has a gentle slope, in a set-up period.

*22. A gas discharge panel in which a plurality of display electrode pairs that are each made up of a sustain electrode and a scan electrode are arranged so as to cross a plurality of cells arranged along a longitudinal direction of the gas discharge panel, a main discharge gap existing between a sustain electrode and a scan electrode in each pair, wherein:*

*the sustain electrode and the scan electrode each have (a) a plurality of line parts and (b) a connector part which connects at least two line parts out of the plurality of line parts in each of the plurality of cells.*

*23. The gas discharge panel of claim 22, wherein*

*a plurality of barrier ribs are provided to separate the display electrodes in the longitudinal direction, and*

*each connector part is provided in a cell sandwiched between two adjacent barrier ribs.*

*24. The gas discharge panel of claim 22, wherein*

*the sustain electrode and the scan electrode occupy less than 40% of a cell area of each of the plurality of cells.*

*25. The gas discharge panel of claim 22, wherein*

*in each sustain electrode and each scan electrode each, line parts other than a line part that is closest to the main discharge gap are wider than the line part that is closest to the main discharge gap.*

*26. The gas discharge panel of claim 22, wherein*

*the sustain electrode and the scan electrode each have two, three or four line parts.*

*27. A gas discharge display device comprising the gas discharge panel of claim 22, wherein*

*a first substrate and a second substrate have been set to face each other, the plurality of display electrode pairs being formed on the first substrate, a plurality of address electrodes being formed on the second substrate, and*

*a drive device, which drives the plurality of display electrode pairs and the plurality of address electrodes, has been connected to the gas discharge panel.*

*28. The gas discharge display device of claim 27, wherein*

*a voltage whose waveform has a gentle slope is applied to the scan electrode in a set-up period.*

*29. The gas discharge display device of claim 28, wherein*

*a voltage change of the slope is in a range of ±10 V/μs.*

*30. A gas discharge panel in which a plurality of display electrode pairs that are each made up of a sustain electrode and a scan electrode are arranged so as to cross a plurality of cells, a main discharge gap existing between a sustain electrode and a scan electrode in each pair, wherein*

*the sustain electrode and the scan electrode each have (a) a plurality of line parts and (b) one or more projections each of which projects toward the main discharge gap from a side of a line part that faces toward the main discharge gap.*

*31. The gas discharge panel of claim 30, wherein*

*the sustain electrode and the scan electrode each have at least two projections that face each other via the main discharge gap.*

*32. The gas discharge panel of claim 30, wherein*

*the sustain electrode and the scan electrode each have a connector part which connects at least two adjacent line parts out of the plurality of line parts in each of the plurality of cells.*

*33. The gas discharge panel of claim 32, wherein*
*phosphor layers of red, green, and blue are formed one by one in a plurality of cells,*
*the sustain electrode and the scan electrode each have at least three line parts, and*
*a distance between the connector part and the main discharge gap in each cell increases in an order of red, green, and blue.*

*34. The gas discharge panel of claim 32, wherein*
*some of the plurality of cells differ from the remaining cells in a cell width along the longitudinal direction,*
*the sustain electrode and the scan electrode each have at least three line parts, and*
*in each cell, the connector part is closer to the main discharge gap as the cell width is smaller.*

*35. The gas discharge panel of claim 32, wherein*
*phosphor layers of red, green, and blue are formed one by one in a plurality of cells,*
*the sustain electrode and the scan electrode each have at least three line parts, and*
*in cells corresponding to phosphor layers of one of red, green, and blue, the connector part is closer to the -main discharge gap as a luminance of phosphor is smaller.*

*36. The gas discharge panel of claim 32, wherein*
*the sustain electrode and the scan electrode each have at least three line parts, and*
*in each cell which requires a lower drive voltage if the connector is not provided, the connector part is positioned farther from the main discharge gap.*

*37. The gas discharge panel of claim 32, wherein*
*a plurality of barrier ribs are provided to separate the display electrodes in the longitudinal direction, and*
*each connector part is provided in a cell sandwiched between two adjacent barrier ribs.*

*38. The gas discharge panel of claim 32, wherein*
*the connector part is provided in a central part of a cell.*

*39. The gas discharge panel of claim 32, wherein*
*the plurality of display electrode pairs are arranged along a row direction of the panel, and*
*a line part of a scan electrode or a sustain electrode in each of two display electrode pairs that are adjacent in the row direction is shared by the two display electrode pairs.*

*40. The gas discharge panel of claim 32, wherein*
*in each sustain electrode and in teach scan electrode, the connector part branches as the connector part is farther from the main discharge gap.*

*41. The gas discharge panel of claim 32, wherein*
*in each sustain electrode and in each scan electrode, the connector part includes a discharge developing part that is provided along a longitudinal direction of the display electrodes in a cell.*

*42. The gas discharge panel of claim 32, wherein*
*the sustain electrode and the scan electrode each have at least three line parts, and*
*the line parts are connected by the connector part in a straight line along a width direction thereof.*

*43. The gas discharge panel of claim 30, wherein*
*the sustain electrode and the scan electrode each have a projection that projects from a side of a line part toward a side of another line part among the plurality of line parts.*

*44. The gas discharge panel of claim 30, wherein*
*in each cell, a length of the projection in the longitudinal direction of the line parts is 50% or less of a cell width in the longitudinal direction.*

*45. The gas discharge panel of claim 30, wherein*
*in each cell, a length of the projection in the longitudinal direction of the line parts is 20% or less of a cell width in the longitudinal direction.*

*46. The gas discharge panel of claim 30, wherein*
*the projection is in a shape of a triangle, a quadrilateral, wave, or a letter T.*

*47. The gas discharge panel of claim 30, wherein*
*the sustain electrode and the scan electrode each have at least three line parts, and*
*a line part among the line parts has two projections that project from two sides thereof toward sides of adjacent line parts that face the two sides thereof, respectively.*

*48. The gas discharge panel of claim 43, wherein*
*a distance between the projection and a line part facing the projection is equal to or less than the main discharge gap.*

*49. The gas discharge panel of claim 43, wherein*
*a distance between the projection and a line part facing the projection is equal to or less than a half of the main discharge gap.*

*50. The gas discharge panel of claim 43, wherein*
*a plurality of barrier ribs are provided to separate the display electrodes in the longitudinal direction, and*
*each projection is provided in a cell sandwiched between two adjacent barrier ribs.*

*51. The gas discharge panel of claim 43, wherein*
*a plurality of barrier ribs are provided to separate the display electrodes in the longitudinal direction,*
*the line parts are arranged so as to cross the barrier ribs, and one or more line parts among the line parts have a wide projection which is larger than each barrier rib in width, and each wide projection is provided at a region where a line part crosses a barrier rib such that each wide projection overlaps with the barrier rib and protrudes into a cell.*

*52. The gas discharge panel of claim 32, wherein*
*the sustain electrode and the scan electrode each are a metal electrode.*

*53. The gas discharge panel of claim 52, wherein*
*the metal electrode either has a layered structure of Cr/Cu/Cr or is made of one or more materials selected from a group consisting of Ag, Pt, Au, Al, Ni and Cr.*

*54. The gas discharge panel of claim 53, wherein*
*the sustain electrode and the scan electrode occupy less than 40% of a cell area of each of the plurality of cells.*

*55. The gas discharge panel of claim 54, wherein*
*in each sustain electrode and each scan electrode each, line parts other than a line part that is closest to the main discharge gap are wider than the line part that is closest to the main discharge gap.*

*56. The gas discharge panel of claim 55, wherein*
*the sustain electrode and the scan electrode each have two, three or four line parts.*

*57. The gas discharge panel of claim 56, wherein*
*the sustain electrode and the scan electrode each have at least three line parts, and*
*a distance between any two adjacent line parts is narrower as the two adjacent line parts are farther from the main discharge gap.*

* * * * *